US011056014B1

(12) United States Patent
Chasen et al.

(10) Patent No.: US 11,056,014 B1
(45) Date of Patent: Jul. 6, 2021

(54) VIRTUAL CLASSROOM OVER A GROUP MEETING PLATFORM

(71) Applicant: ClassEDU Inc., Austin, TX (US)

(72) Inventors: Michael L. Chasen, Austin, TX (US); Wesley A. Boyer, Austin, TX (US)

(73) Assignee: ClassEDU Inc., Austin, TX (US)

( * ) Notice: Subject to any disclaimer, the term of this patent is extended or adjusted under 35 U.S.C. 154(b) by 0 days.

(21) Appl. No.: 17/069,769

(22) Filed: Oct. 13, 2020

Related U.S. Application Data

(60) Provisional application No. 63/049,040, filed on Jul. 7, 2020.

(51) Int. Cl.
  *G09B 19/00* (2006.01)
  *G09B 7/00* (2006.01)
  *H04L 29/06* (2006.01)

(52) U.S. Cl.
  CPC .............. *G09B 7/00* (2013.01); *G09B 19/00* (2013.01); *H04L 65/403* (2013.01)

(58) Field of Classification Search
  None
  See application file for complete search history.

(56) References Cited

U.S. PATENT DOCUMENTS

2019/0088153 A1  3/2019  Bader-Natal

*Primary Examiner* — James B Hull
(74) *Attorney, Agent, or Firm* — McDermott Will & Emery LLP

(57) ABSTRACT

A method to provide a remote classroom experience is provided. The method includes receiving, in a server, a data feed from multiple participants in a group meeting, merging the data feed from each of the participants into a group presentation, and providing the group presentation to one or more of the participants. The method also includes tracking at least one application data from at least one participant in the group meeting and providing an assignment to a selected group of participants in the group meeting. The method also includes generating a grade of the assignment for each of the selected group of participants based on a template document stored in a database and providing, to the second participant, the grade of the assignment for each of the selected group of participants. A system and a non-transitory, computer readable medium storing instructions to perform the above method are also provided.

13 Claims, 39 Drawing Sheets

VIRTUAL CLASSROOM OVER A GROUP MEETING PLATFORM

CROSS-REFERENCE TO RELATED APPLICATIONS

The present application is related and claims priority under 35 U.S.C. 119(e) to U.S. provisional patent application 63/049,040, entitled VIRTUAL CLASSROOM OVER A GROUP MEETING PLATFORM, to Michael L. Chasen et al., and filed on Jul. 7, 2020, the contents of which are hereby incorporated in their entirety, for all purposes.

BACKGROUND

Field

The present disclosure relates to platforms for synchronous group meetings with enhanced learning tools for real-time participant interactions and feedback. More specifically, methods and systems as disclosed herein provide a virtual classroom where teachers and students may have an improved learning experience, including one-on-one interactions and multimedia access.

Description of Related Art

Current trends in the industry point to the extended use of meeting platforms for remote access to multiple attendees, including video capabilities, chat options, interpersonal messaging, and other synchronous activities during a scheduled meeting. However, a classroom configuration puts stringent demands on the context of a typical group meeting, which lack the learning and audience monitoring tools that are desirable in an educational environment. Many computerized network systems have been developed to enhance, and in some instances support, the educational experience. However, most of the existing solutions operate in an asynchronous manner, essentially working as intelligent databases for assignment preparation, grading, and statistical analysis over a large student population and a complex scholar curriculum. However, no commercial system available today is capable of combining the synchronous capabilities of a remote group meeting platform with network-based, computerized educational tools.

SUMMARY

In a first embodiment, a computer-implemented method includes receiving, in a server, a data feed from multiple participants in a group meeting and merging the data feed from each of the participants into a group presentation. The computer-implemented method also includes providing the group presentation to one or more of the participants, tracking at least one application data from at least one participant in the group meeting, and providing an engagement report of at least one participant to a second participant in the group meeting. The computer-implemented method also includes providing an assignment to a selected group of participants in the group meeting, the assignment selected by the second participant, generating a grade of the assignment for each of the selected group of participants based on a template document stored in a database, and providing, to the second participant, the grade of the assignment for each of the selected group of participants.

In a second embodiment, a computer-implemented method includes authorizing a participant request to remotely access a group meeting and providing a lecture material to the group meeting. The computer-implemented method also includes receiving a feedback input for the lecture material from one or more participants in the group meeting, selecting at least one participant based on an engagement data displayed for the group meeting and the feedback input, and providing a grade to each of the participants in the group meeting based on the feedback input.

In a third embodiment, a system includes one or more processors and a memory storing instructions. When executed by the one or more processors, cause the system to receive, in a server, a data feed from multiple participants in a group meeting and merge the data feed from each of the participants into a group presentation. The one or more processors also execute instructions that cause the system to provide the group presentation to one or more of the participants, to track at least one application data from at least one participant in the group meeting, and to provide an assignment to a selected group of participants in the group meeting, the assignment selected by a second participant. The one or more processors also execute instructions that cause the system to generate a grade of the assignment for each of the selected group of participants based on a template document stored in a database, and to provide, to the second participant, the grade of the assignment for each of the selected group of participants, wherein to merge the data feed from each of the participants into a group presentation the one or more processors execute instructions to synchronize the data feed from each of the participants and forming the group presentation as a real-time experience.

In yet another embodiment, a non-transitory, computer readable medium stores instructions which, when executed by a processor, cause the processor to perform a method. The method includes receiving, in a server, a data feed from multiple participants in a group meeting and merging the data feed from each of the participants into a group presentation. The method also includes providing the group presentation to one or more of the participants, tracking at least one application data from at least one participant in the group meeting, and providing an engagement report of at least one participant to a second participant in the group meeting. The method also includes providing an assignment to a selected group of participants in the group meeting, the assignment selected by the second participant, generating a grade of the assignment for each of the selected group of participants based on a template document stored in a database, and providing, to the second participant, the grade of the assignment for each of the selected group of participants.

BRIEF DESCRIPTION OF THE DRAWINGS

FIGS. 3A-L illustrate teaching and learning tools for a virtual classroom, according to some embodiments.

FIGS. 5A-D illustrate an attendance and identity verification tool for a virtual classroom, according to some embodiments.

FIGS. 7A-H illustrate a classroom management tool for a virtual classroom, according to some embodiments.

In the figures, elements having the same or similar reference numerals correspond to features having the same or similar description, unless stated otherwise.

DETAILED DESCRIPTION

In the following detailed description, numerous specific details are set forth to provide a full understanding of the present disclosure. It will be apparent, however, to one ordinarily skilled in the art that embodiments of the present disclosure may be practiced without some of these specific details. In other instances, well-known structures and techniques have not been shown in detail so as not to obscure the disclosure.

General Overview

The present disclosure provides an environment and a network architecture that enables the use of a remote group meeting platform for implementing a virtual classroom having enhanced educational capabilities including teaching and learning tools. In addition, in some embodiments, the capabilities of the remote group meeting platform are enhanced to provide student engagement functionalities and classroom management features. Further, some embodiments also include the ability for the teacher and/or a teaching assistant to track, in real-time, student attendance and participation for each of the registered and attending students. Some embodiments include a proctoring tool for assignments and exams, allowing the teacher to safely conduct grading and evaluation processes remotely.

Embodiments as disclosed herein provide a technical solution for the technical problem of conducting a synchronous teaching event for multiple remote users, including individualized learning tools and tracking of in-class performance. More generally, embodiments as disclosed herein may in fact replace the more traditional teaching experience by using computer and computer network capabilities to provide new and refined learning tools, such as instant polling and pop quizzes, and incentivizing participation for lagging or disengaged individuals.

The present disclosure further improves the functioning of a computer and a computer network by allocating bandwidth and computational resources judiciously so that a synchronous teaching event (e.g., a class) occurs without interruption and without crashing the network or any one of the client devices used by the students and teachers to access the teaching event.

Example System Architecture

Figure 1:
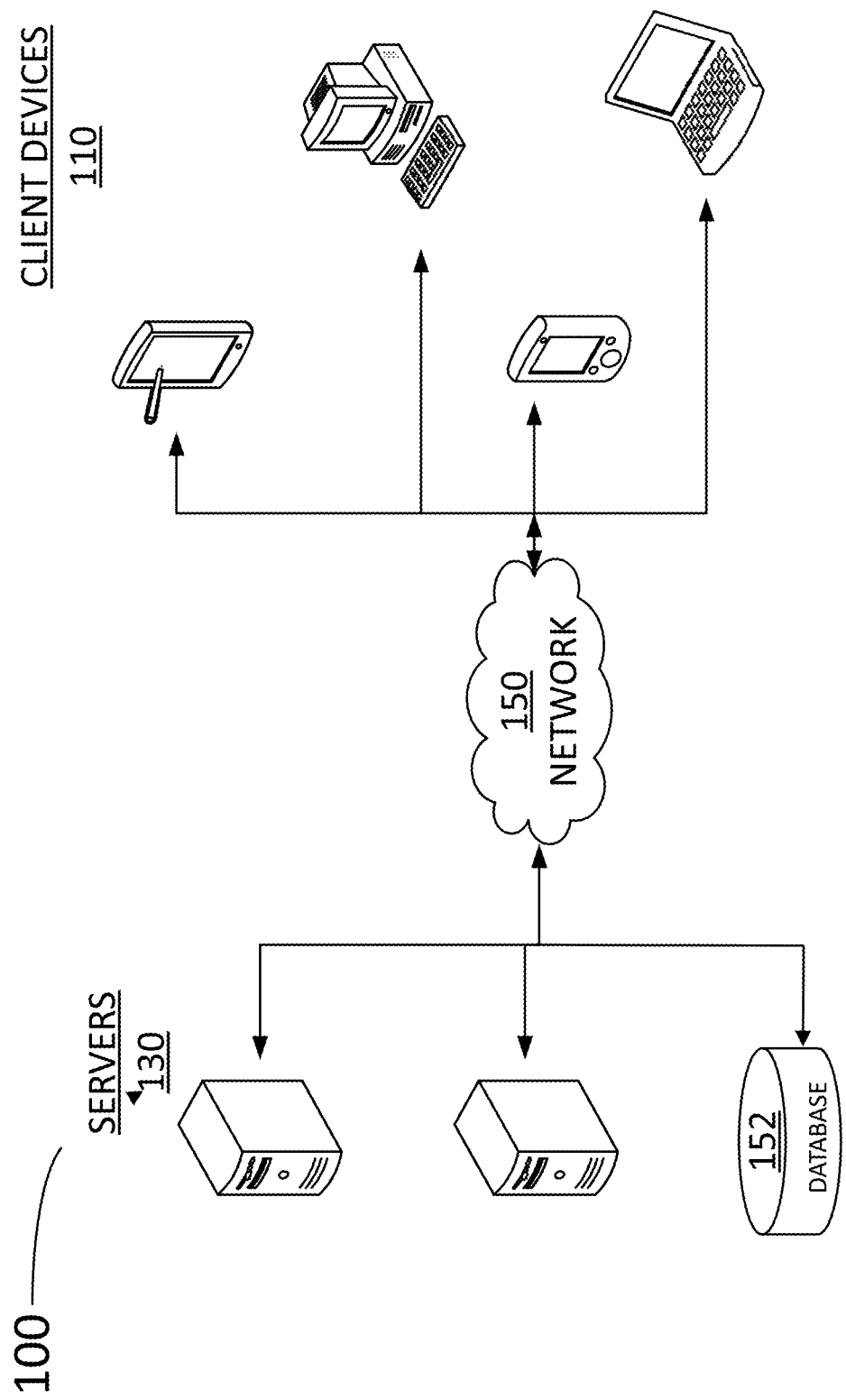
FIG. 1 illustrates an architecture in a system for providing a classroom experience in a group meeting platform, according to some embodiments.

FIG. 1 illustrates an architecture 100 in a system for providing a classroom experience in a group meeting platform, according to some embodiments. Architecture 100 includes servers 130 and client devices 110 coupled over a network 150. Client devices 110 may be used by participants in the classroom experience. In some embodiments, one or more of the participants includes a teacher or a teaching assistant having certain privileges for accessing class materials and feeds from the other participants in the classroom experience. In some embodiments, at least one or more participants are students registered for the class.

One of servers 130 may be configured to host a memory, including instructions which, when executed by a processor, cause the server to perform at least some of the steps in methods as disclosed herein. In some embodiments, the memory may include a database 152 external to, and coupled with, servers 130 through network 150. In some embodiments, the architecture provides personalized digital learning tools to each of a group of participants, who may be the users of client device communicatively coupled with the network. The targeted digital learning tool may be retrieved from a database, and may be selected by at least one of the participants in the classroom experience (e.g., a teacher or a teacher assistant).

Servers 130 may include any device having an appropriate processor, memory, and communications capability for hosting a database and a classroom engine. The classroom engine may be accessible by various client devices 110 over network 150. In some embodiments, servers 130 may include a dynamic creative rendering server, a publisher, or a course management system. Client devices 110 may include, for example, desktop computers, mobile computers, tablet computers (e.g., including e-book readers), mobile devices (e.g., a smartphone or PDA), or any other devices having appropriate processor, memory, and communications capabilities for accessing the image search engine and the history log on one or more of the servers. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, a tree or hierarchical network, and the like.

Figure 2:
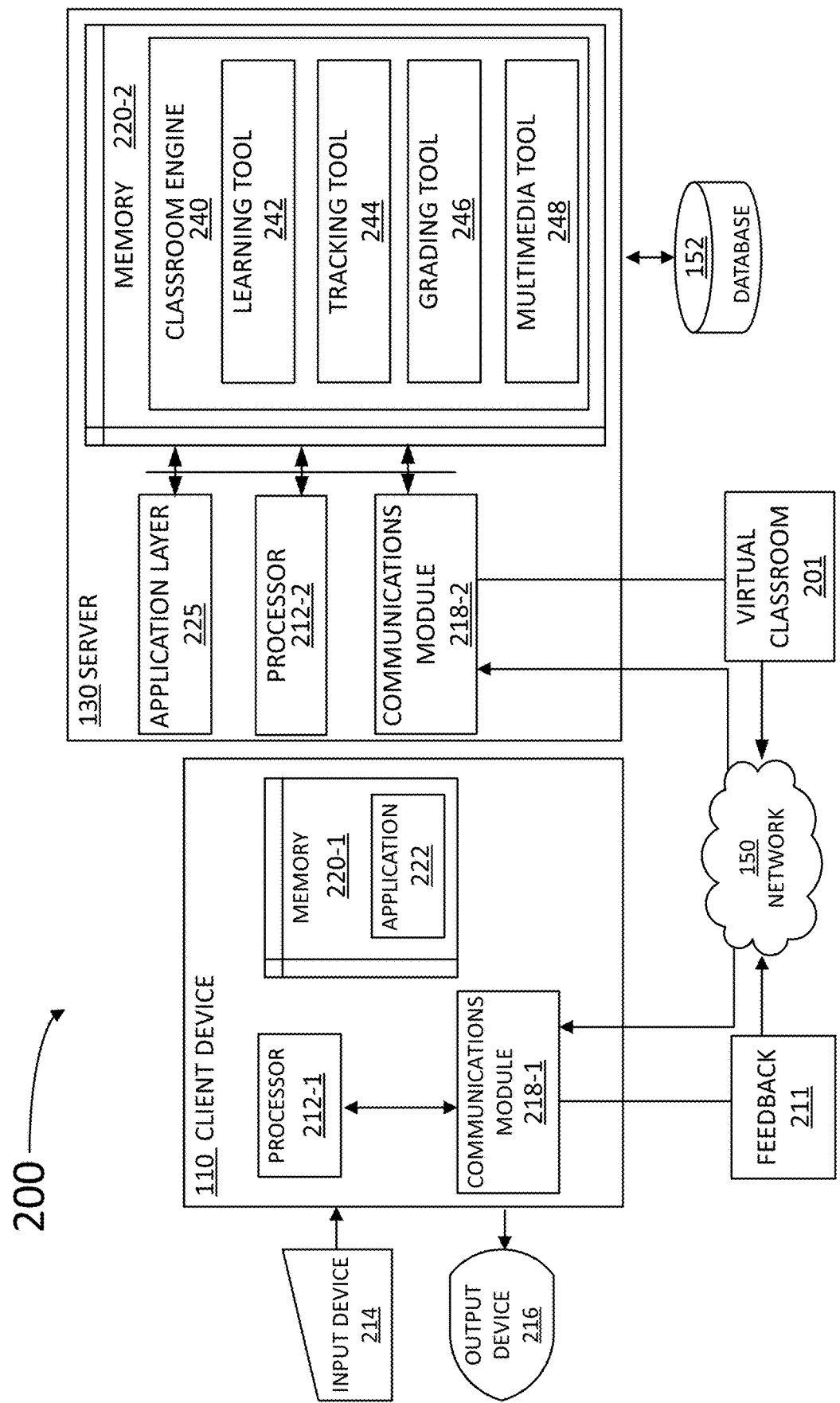
FIG. 2 illustrates details of exemplary devices used in one embodiment of the architecture of FIG. 1, according to some embodiments.

FIG. 2 illustrates details of exemplary devices used in one embodiment of architecture 200 (cf. architecture 100), according to some embodiments. Client device 110 may include a processor 212-1 and a memory 220-1, and server 130 may include a processor 212-2 and a memory 220-2. Hereinafter, processors 212-1 and 212-2 will be collectively referred to as "processors 212," and memories 220-1 and 220-2 will be collectively referred to as "memories 220." Client device 110, server 130, and database 152 are communicatively coupled over network 150 via respective communications modules 218-1 and 218-2 (hereinafter, collectively referred to as "communication modules 218"). Communications modules 218 interface with network 150 to send and receive information, such as data, requests, responses, and commands to other devices on network 150. For example, client device 110 may provide a feedback 211 from a teacher or teaching assistant to a student in a virtual classroom 201, which in turn is provided from server 130 to a student or teacher using client device 110. Communications modules 218 can be, for example, modems or Ethernet cards. Client device 110 may be coupled with an input device 214 and with an output device 216. Input device 214 may include a keyboard, a mouse, a pointer, or even a touch-screen display that a user (e.g., a participant) may utilize to interact with client device 110. Likewise, output device 216 may include a display and a speaker with which the user may retrieve results from client device 110. In this regard, client device 110 may be a smartphone or other mobile device used by a participant at the time of the group meeting. In some embodiments, client device 110 may include a computer or any other network connected device. The participant in the group meeting may be a professor, a teacher, a teaching assistant, or any combination of the above, or one or more students. In some embodiments, the group meeting takes place with a selected frequency on a scheduled basis. In this regard, one or more of the participants may access the group meeting using different client devices 110 on different occasions.

In some embodiments, processor 212-1 executes instructions stored in a memory 220-1, and to cause client device 110 to perform at least some of the steps in methods consistent with the present disclosure. Memory 220-1 may further include an application 222 including specific instructions which, when executed by processor 212-1, cause a learning tool 242 to display learning materials for the participant through virtual class room 201, or a participant feedback 211 to be displayed to a teacher or teaching assistant also participating in the classroom experience. Application 222 may be installed by and perform scripts and other routines provided through an application layer 225 in server 130. Application layer 225 produces the output of a classroom engine 240 in the form of virtual classroom 201 or "feed." Virtual classroom 201 includes learning materials such as quizzes, tests, virtual handouts, poll questions, and multimedia files (e.g., audio, video, and the like). In some embodiments, the learning materials may include visual representations and graphics for the teacher or teaching assistants, indicating test results, poll results, and the like. Accordingly, in some embodiments, the output from application layer 225 includes a graphics bundle illustrating a statistical analysis, charts, and an explanation of student engagement for each of the students attending the class.

In some embodiments, a participant having a valid student identification may download application 222 from a school website, or directly from server 130. The learning materials may include multiple digital learning tools presented to the participant by server 130, and the participant may store at least some of the digital learning tools in memory 220-1. In some embodiments, application 222 includes instructions which, when executed by processor 212-1, cause a display in output device 216 to display a portal of classroom engine 240. Accordingly, the application may include instructions, which when executed by the processor in the client device, cause a display in the client device to display a personalized learning material (e.g., quiz, test, question, poll question, white paper, and the like). Moreover, in some embodiments, application 222 may include instructions which, when executed by processor 212-1, cause client device 110 to store feedback 211 in memory 220-1, or in database 152 (e.g., a completed or partially completed test, a graded or partially graded test, and the like).

Server 130 includes a memory 220-2, a processor 212-2, and a communications module 218-2. Processor 212-2 executes instructions, such as instructions physically coded into the processor, instructions received from software in memory 220-2, or a combination of both. Memory 220-2 includes classroom engine 240 to provide learning materials and other classroom support for participants in virtual classroom 201. In some embodiments, classroom engine 240 is also configured to receive, from one or more of the participants, feedback 211, in response to the learning materials in virtual classroom 201. For example, in some embodiments classroom engine 240 receives a filled test or quiz from each of the participants. Classroom engine 240 evaluates feedback 211 from the participants (e.g., grade the tests and quizzes, or respond to queries, questions, and requests for learning materials). Classroom engine 240 may include learning tool 242, a tracking tool 244, a grading tool 246, and a multimedia tool 248.

Learning tool 242 incorporates learning materials (e.g., syllabus, assignments, test/quizzes) and tools into virtual classroom 201 for an online chat environment. In some embodiments, learning tool 242 pushes assignments and tests/quizzes to one or more selected students (or to all students in virtual classroom 201) via application layer 225. The assignments may automatically pop-up on the screen of output device 216.

Tracking tool 244 keeps a list of known students in the class. In some embodiments, tracking tool 244 compares a list of attendees to a list of known students in the class and prepares a list of the students that are absent. In some embodiments, the list of students that are absent may be displayed to the teacher or one of the teaching assistants, via application layer 225. In some embodiments, tracking tool 244 keeps track and reports (e.g., to the teacher or one of the teaching assistants) how long someone speaks in a meeting and if it is below average, average, or above average. In some embodiments, tracking tool 244 evaluates an engagement level for each of the students in the class, based on the tracking data collected from the students. Accordingly, the teacher or at least one of the teaching assistants may have visibility to an engagement report illustrating the engagement level for each of the students, pushed through application layer 225. In some embodiments, tracking tool 244 may push an alert to the teacher or a teaching assistant when a student makes another window on their computer screen (e.g., the class meeting is moved to the background or is not the primary focus of the student on client device 110). Tracking tool 244 may also perform attendance tracking and reporting. In some embodiments, tracking tool 244 reports when someone attends the class meeting, when someone enters the class meeting and what time they leave, shows amount of participation time, and focus time during which application 222 is the main focus on client device 110.

Grading tool 246 provides real-time evaluation of the learning materials provided to the students, based on the feedback received. Multimedia tool 248 provides multimedia files (e.g., video, audio, virtual reality feeds) to be included as the learning materials. In some embodiments, multimedia tool 248 retrieves one or more multimedia files from the database or through a third party server in the network. In that regard, multimedia tool 248 may also embed a link to a network address (e.g., an http address or universal resource location—URL) for a file or a feed in the learning materials provided to the students. Accordingly, in some embodiments, each of the participants may access one or more of the learning materials through a browser (e.g., application 222) installed in client device 110. In some embodiments, multimedia tool 248 may access the network location directly and downstream a multimedia file from the network location into the feed to the participants (e.g., in virtual classroom 201), as part of the learning materials.

In one or more implementations, database 152 may include a list of frequent participants to the group meetings (e.g., student IDs and the like). The participants may have a valid student identification associated with a class, a teacher, or an academic institution. Server 130 may create, update, and maintain database 152, including valid student identifications and academic performance history logs. In that regard, database 152 may be hosted by the academic institution, while classroom engine 240 may be hosted by a DSP server or a dynamic creative rendering server. Accordingly, a DSP server 130 may have access to one or more databases 152, through agreements with one or more academic institutions. In certain aspects, a processor 212-2 hosted by an academic institution accesses and stores data in the database such as valid student identification used at prior class meetings, over a pre-selected span of time.

FIGS. 3A-L illustrate teaching and learning tools for virtual classroom 301A, 301B, 301C, 301D, 301E, 301F, 301G, 301H, 301I, 301J, 301K, 301L, (hereinafter, collectively referred to as "virtual classroom 301") according to some embodiments.

Virtual classroom 301 includes a feature set 305 including functionalities that the teacher can use to replicate an in-person classroom. Virtual classroom 301 includes a video feed of the teacher in a virtual podium 310. In some embodiments, virtual podium 310 stays in the same position during the class. In some embodiments, a guest lecturer, or a presenter, can be moved temporarily to virtual podium 310. Virtual classroom 301 also provides a teaching assistant field (TA-field 340), where video feeds 342-1, 342-2, and 342-3 for teaching assistants (hereinafter, collectively referred to as "TAs 342") are moved to the front of the class. TA-field 340 separates TAs 342 from the rest of the class (e.g., appearing at the top of virtual classroom 301), so that they remain in view of virtual classroom 301 (together with the teacher in virtual podium 310) as the user scrolls over a more crowded student field 350 using a button 355. Accordingly, students 325 may easily engage with and interact with TAs 342.

Feature set 305 includes a participants feature 320, a teaching tools feature 330, a chat feature 360, and a class management feature 370. Teaching tools feature 330 may include tools such as a syllabus 331-1, an assignment tool 331-2, a polling tool 331-3, a test/quiz tool 331-4, a third party application launch 331-5, a screen sharing tool 331-6, a whiteboard tool 331-7, a web browsing tool 331-8, a multimedia playing tool 331-9, and a file sharing tool 331-10. Participants feature 320 includes a teacher 321, a TA list 323, and a student list 325.

Figure 3A:
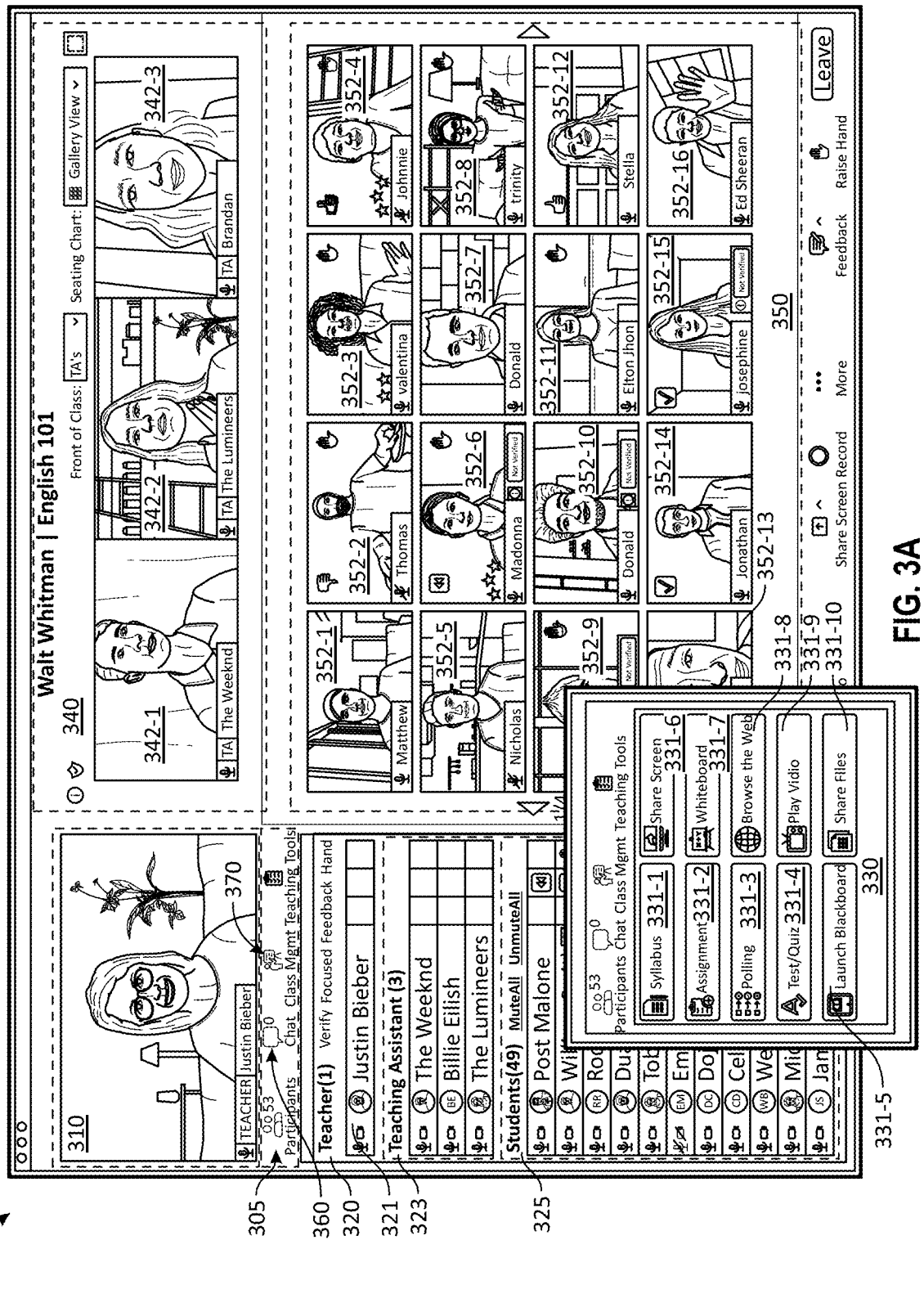

FIG. 3A illustrates classroom 301A including students 352-1, 352-2, 352-3, 352-4 352-5, 352-6, 352-7, 352-8, 352-9, 352-10, 352-11, 352-12, 352-13, 352-14, 352-15, 352-16 (collectively referred to, hereinafter, as "students 352").

Figure 3B:
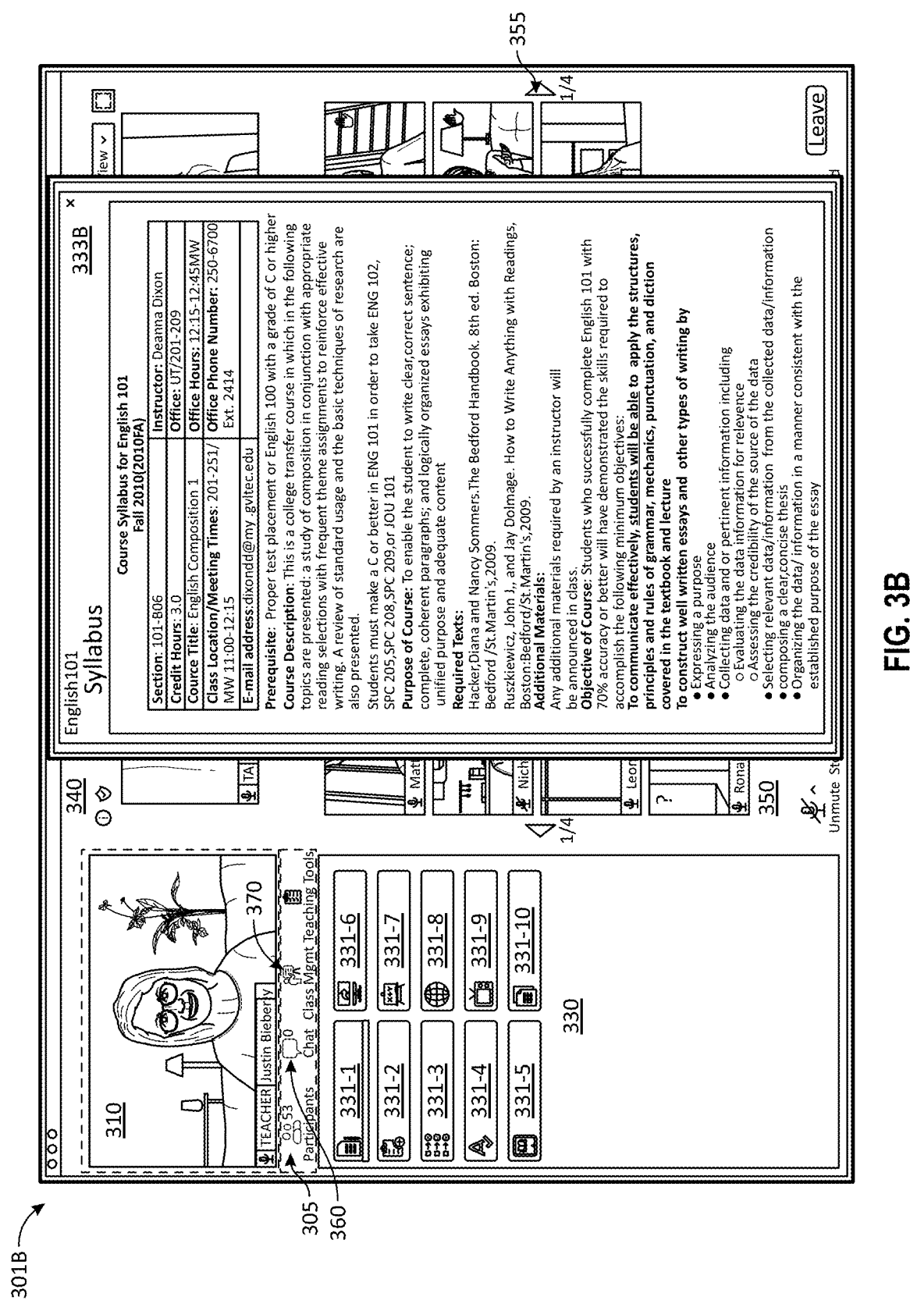

FIG. 3B illustrates classroom 301B wherein a syllabus 333B is opened from teaching tools 330. In some embodiments, syllabus 333B may be presented from syllabus tool 331-1 by the teacher in virtual podium 310, or by any one of TAs 342. Teachers and TAs 342 can easily view and share the course syllabus 333B to ensuring they are staying on track.

Figure 3C:
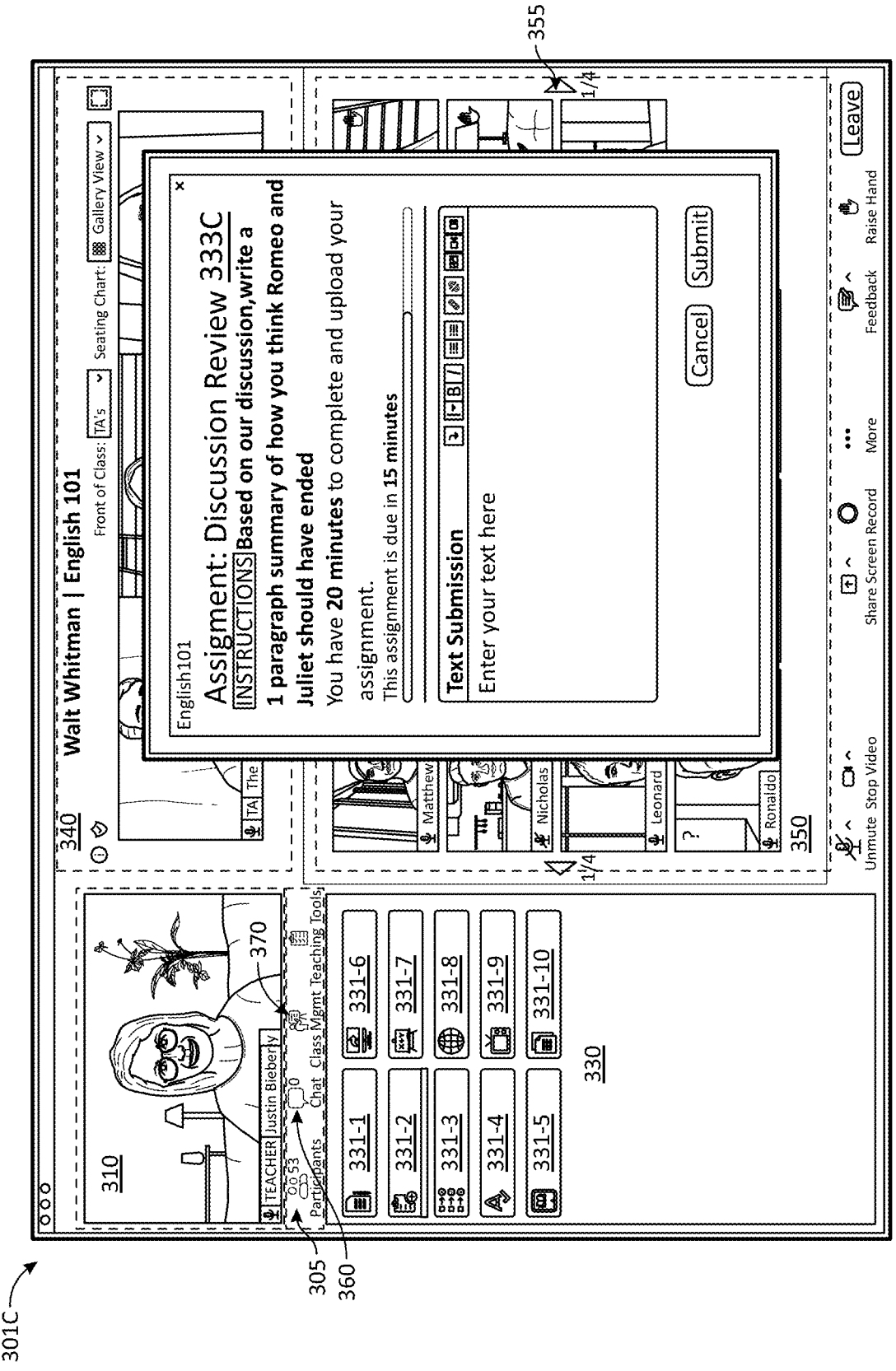

FIG. 3C illustrates classroom 301C, wherein a pop up assignment 333C is provided by teacher 321, through assignment tool 331-2. In-class assignment 333C is a desirable tool of the experience in virtual classroom 301C. In some embodiments, assignment 333C allows teacher 321 to gauge topic mastery and fine tune classroom learning objectives for each student. Teacher 321 in virtual classroom 301C can deploy an array of in-classroom assignments like assignment 333C, in real time, for students to complete and submit.

Figure 3D:
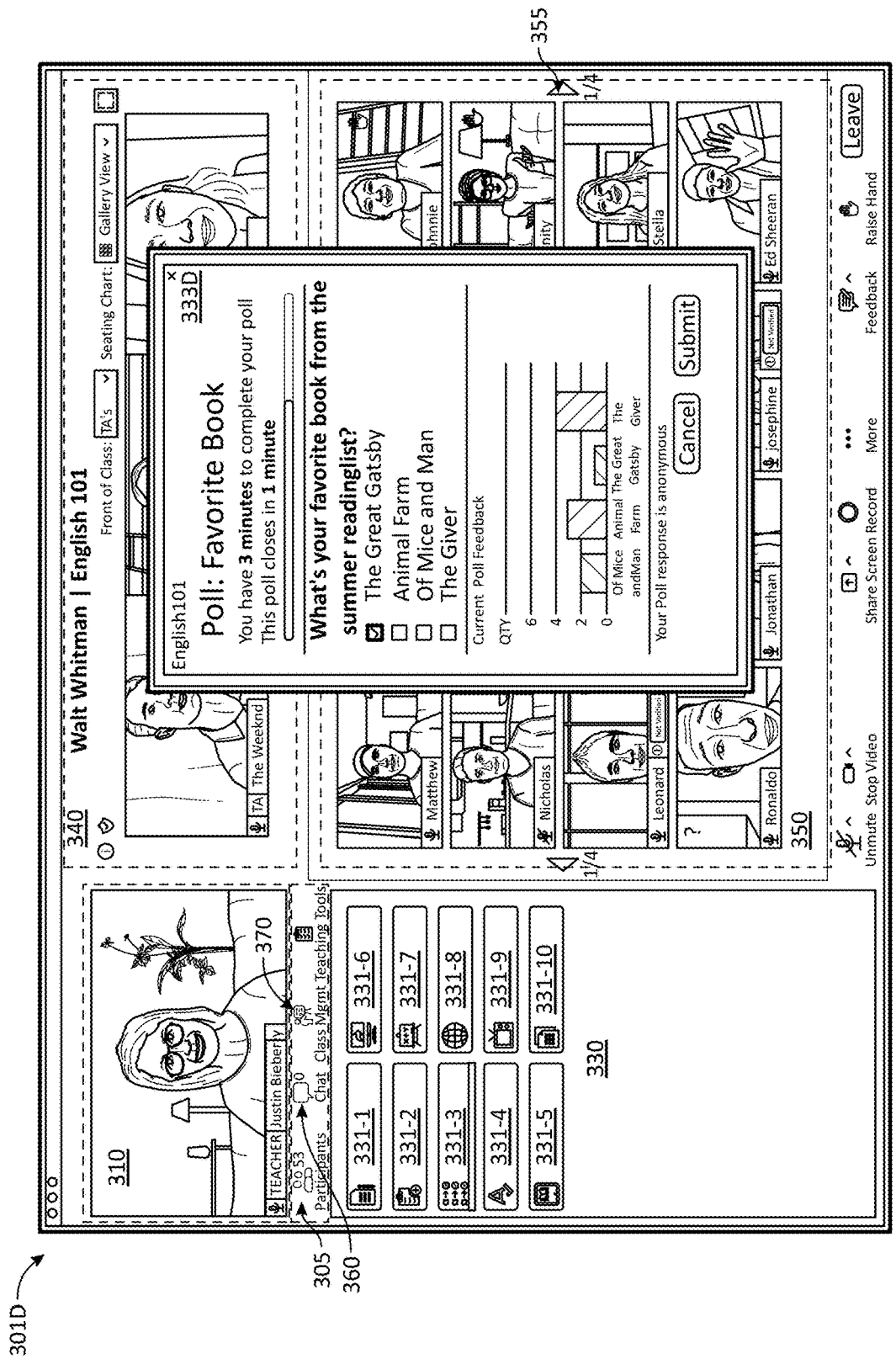

FIG. 3D illustrates classroom 301D, wherein a poll 333D is provided by teacher 321, using polling tool 331-3. Real-time engagement and participation requests such as poll 333D enrich the classroom experience and emulates an in-person learning experience. Virtual classroom 301D enables teacher 321 to spark discussion and better engage the class throughout the lesson with a live, real-time polling.

Figure 3E:
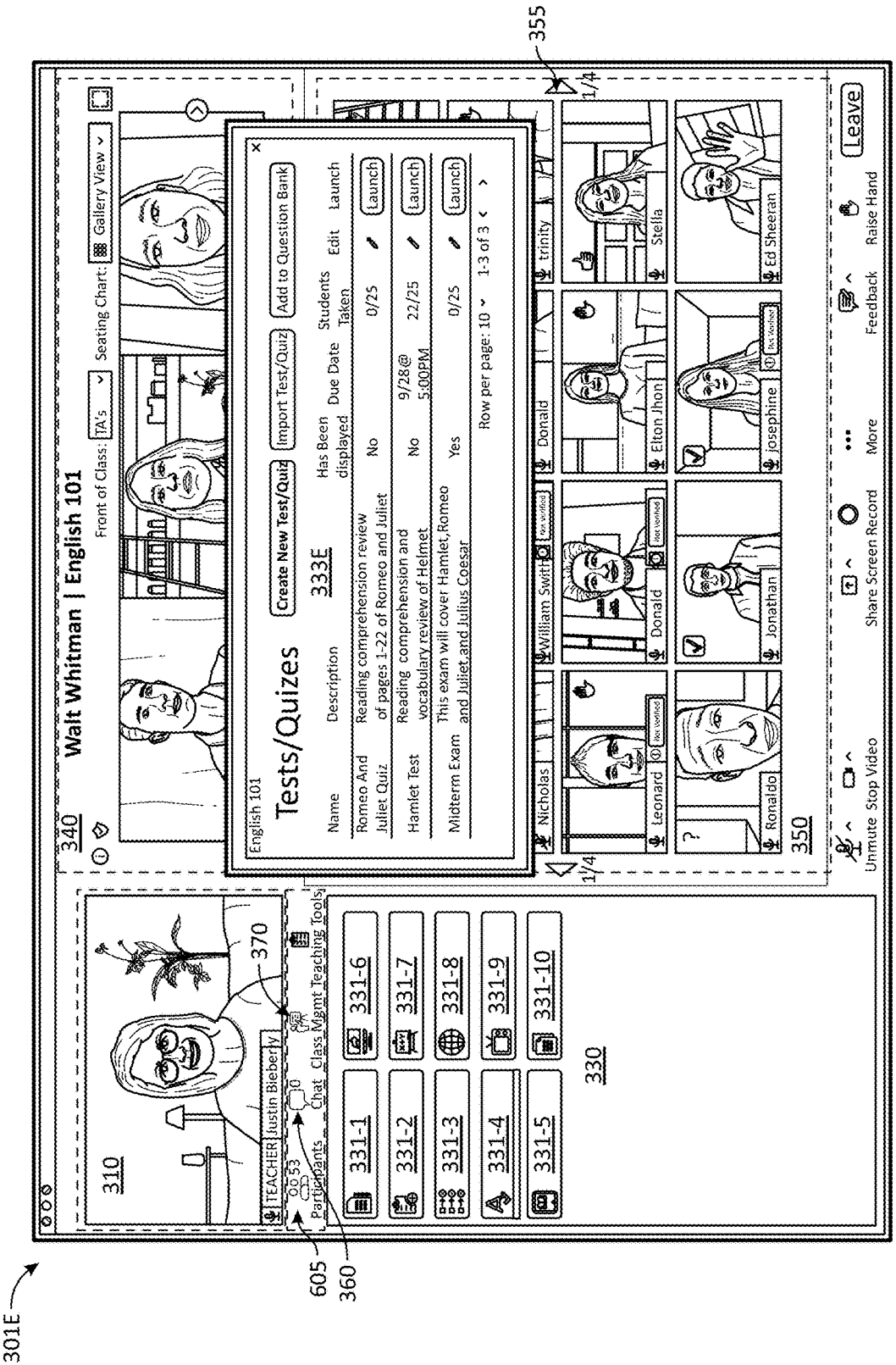

FIG. 3E illustrates classroom 301E, wherein test/quiz tool 331-4 provides a window 333E for the teacher or any one of TAs 342 to prepare and configure a test or quiz, during class. Window 333E enables teacher 321 to administer quizzes and tests in real-time in virtual classroom 301E. More generally, virtual classroom 301E enables a teacher to have an array of quiz, test, and assessment options that can be administered, proctored, and graded in real-time.

Figure 3F:
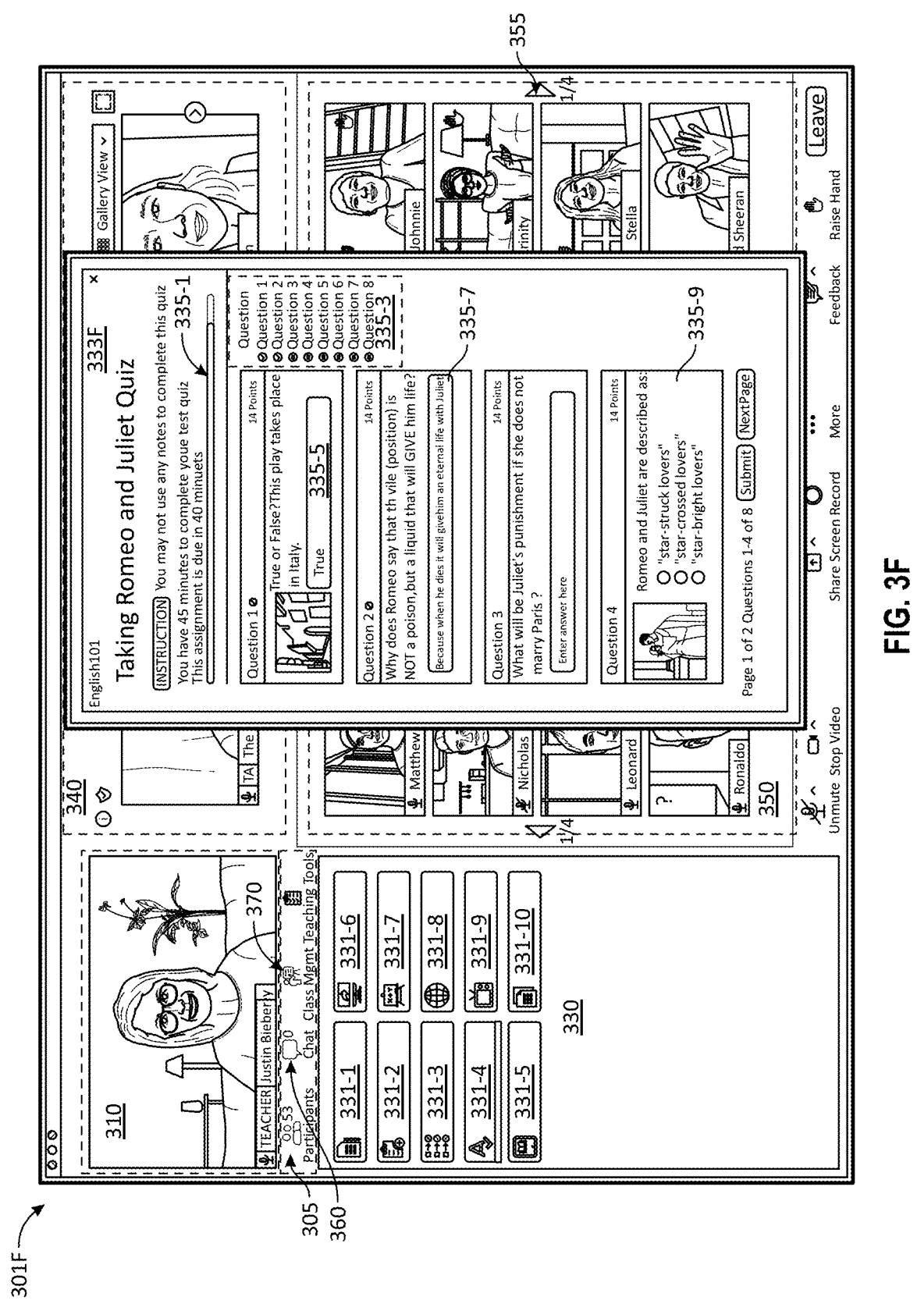

FIG. 3F illustrates a classroom 301F, wherein a quiz 333F is provided by teacher 321 to students 352, during class.

Accordingly, in some embodiments, virtual classroom 301F includes a test and quiz feature to support a variety of assessment styles and to provide helpful tools like timer 335-1 and completion scale 335-3. It supports multiple question types including true/false matching 335-5, fill in the blank/essay questions 335-7, multiple choice questions 335-9, and others as well as computational test questions for math and science classes.

Figure 3G:
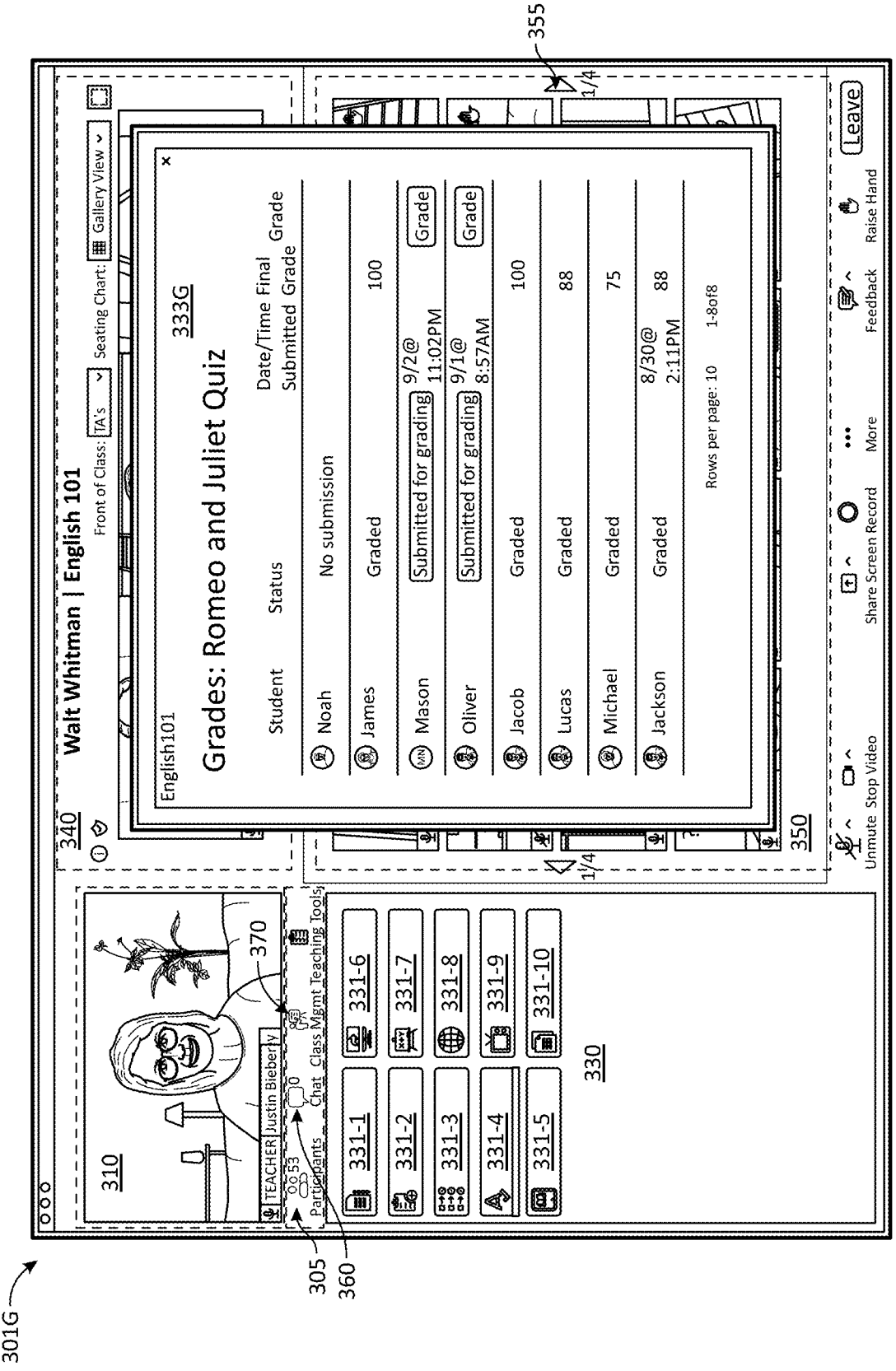

FIG. 3G illustrates classroom 301G, wherein the teacher or any one of TAs 342 uses test/quiz tool 331-4 to review a report 333G for grades of quiz 333F, during class. In some embodiments, report 333G may be prepared by a grading tool that automatically grades the students' response to quiz 333F, in real-time (cf grading tool 246). Report 333G provides real-time feedback and assisting students in real-time is a core component to a productive learning environment in virtual classroom 301G. With virtual classroom 301G, teacher 321 has the option to review and grade tests and quizzes in real time.

Figure 3H:
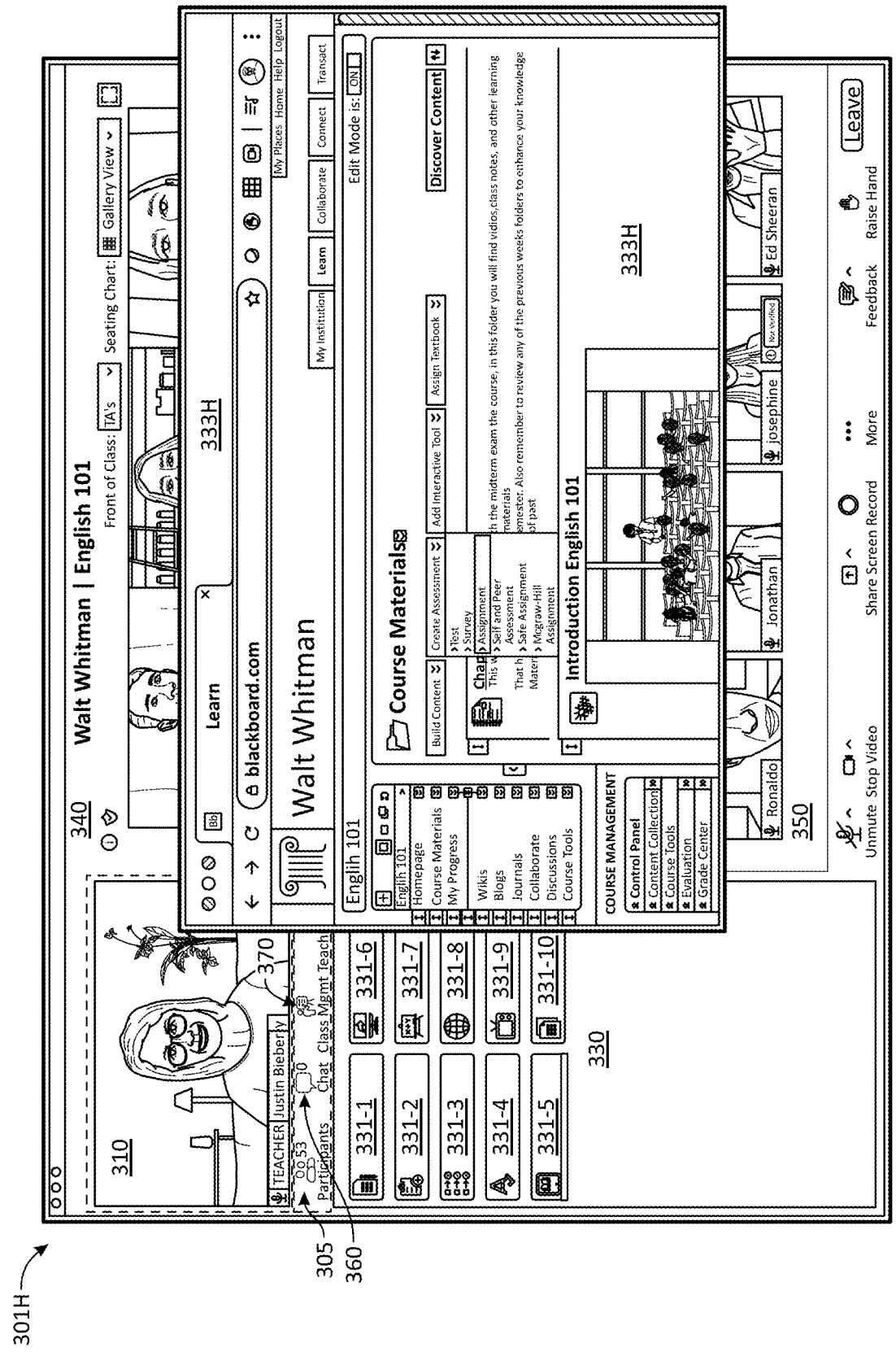

FIG. 3H illustrates classroom 301H, wherein teacher 321 or any one of TAs 342 uses tool 331-5 to launch a third party application 333H containing relevant educational information. Application 333H may include a third party learning resource, to maximize the productivity of virtual classroom 301H. Virtual classroom 301H may include links to multiple course management systems, enabling more time for teaching and learning.

Figure 3I:
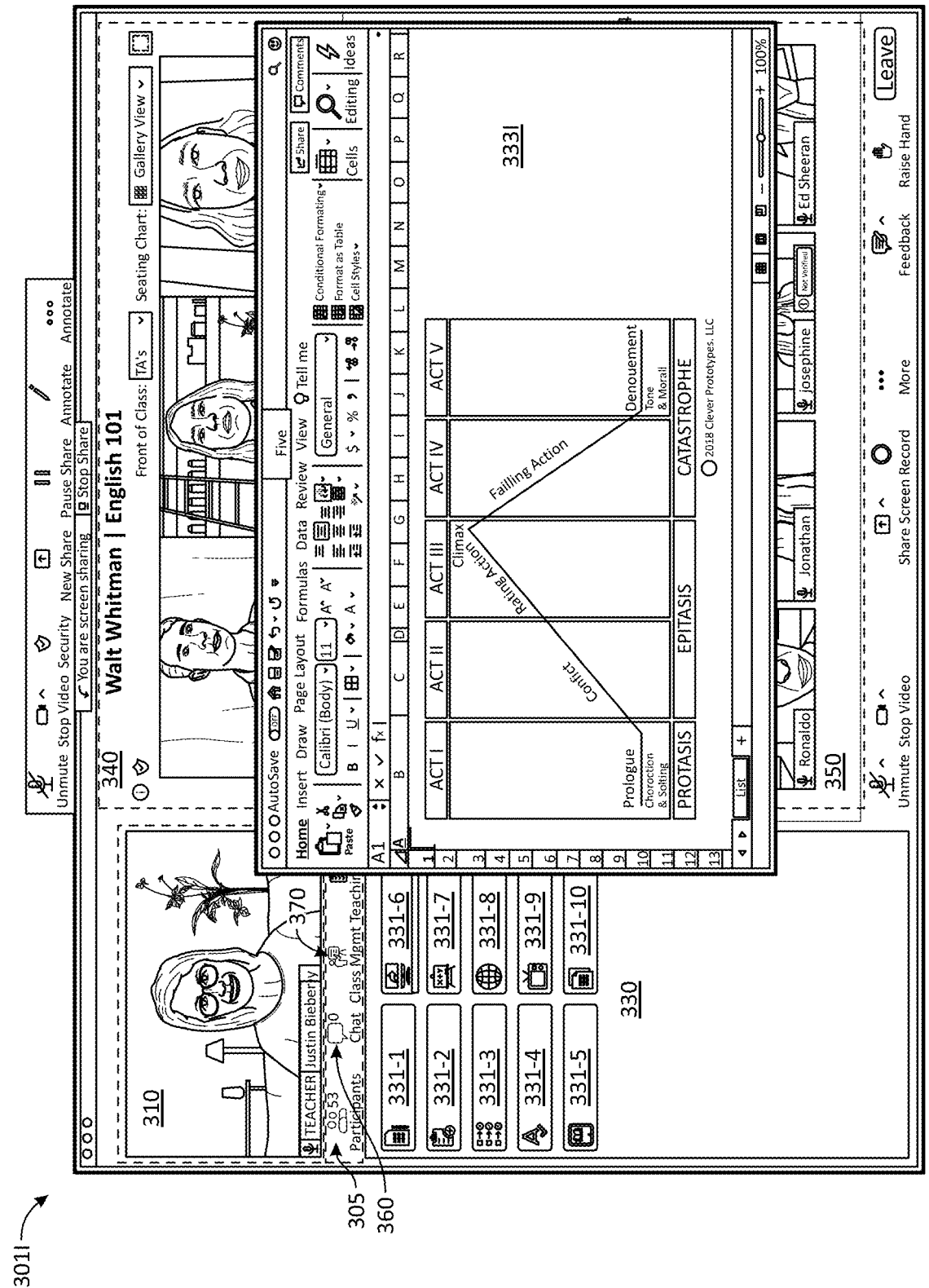

FIG. 3I illustrates virtual classroom 301I, wherein teacher 321 or any one of TAs 342 uses screen sharing tool 331-6 to share screen 333I with students 352. Accordingly, virtual classroom 301I includes screen sharing tool 331-6 to allow teachers 321 to present content and information to the class, contributing to the in-person feel of the classroom experience.

Figure 3J:
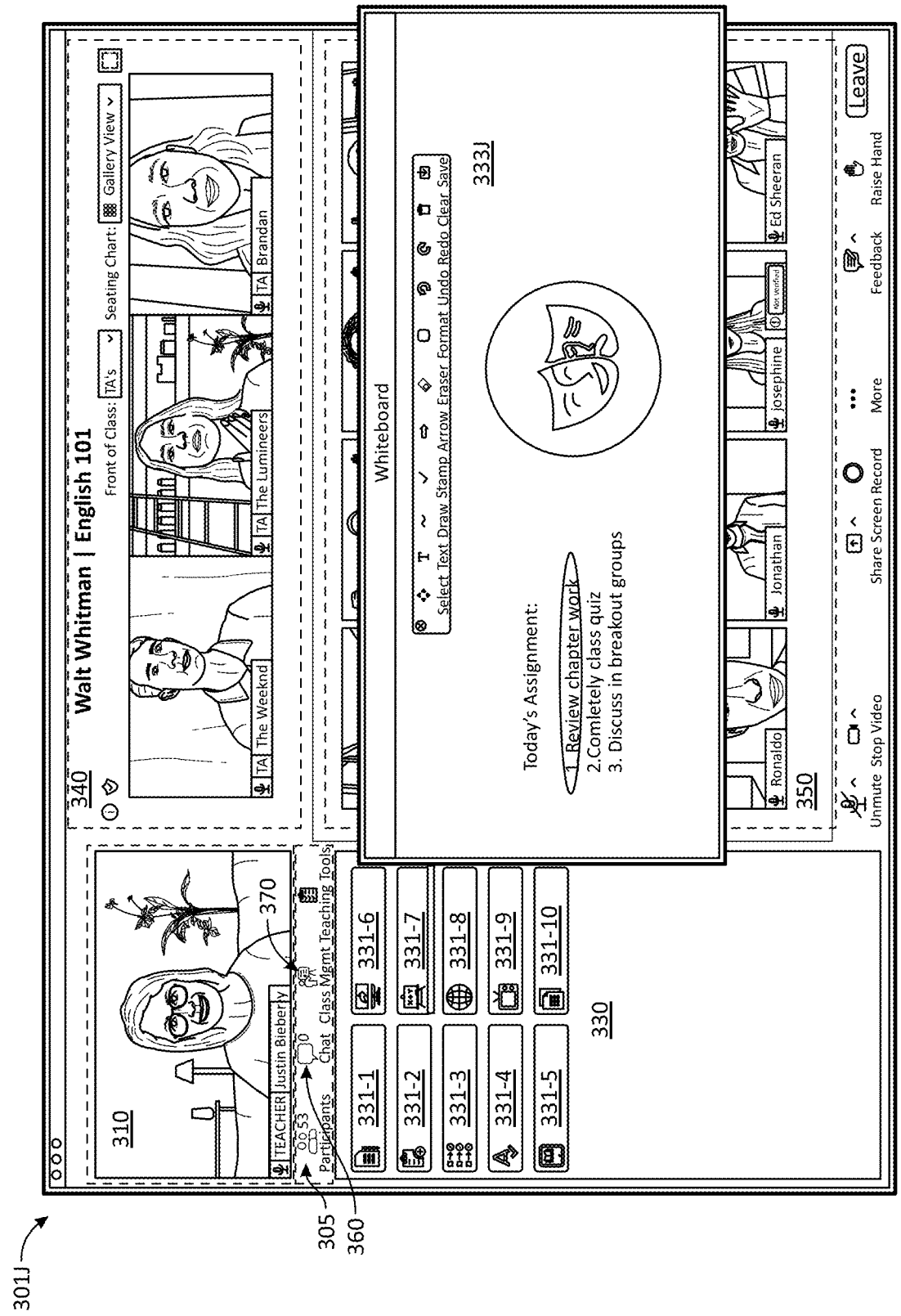

FIG. 3J illustrates virtual classroom 301J, wherein teacher 321 or any one of TAs 342 uses whiteboard tool 331-7 to show a whiteboard 333J to students 352. Whether prepared or impromptu, being able to utilize whiteboard 333J is a desirable component of virtual classroom 301J, according to some embodiments. Virtual classroom 301J brings whiteboard 333J to the forefront, making it easy for teacher 321 to add to their instruction tool set.

Figure 3K:
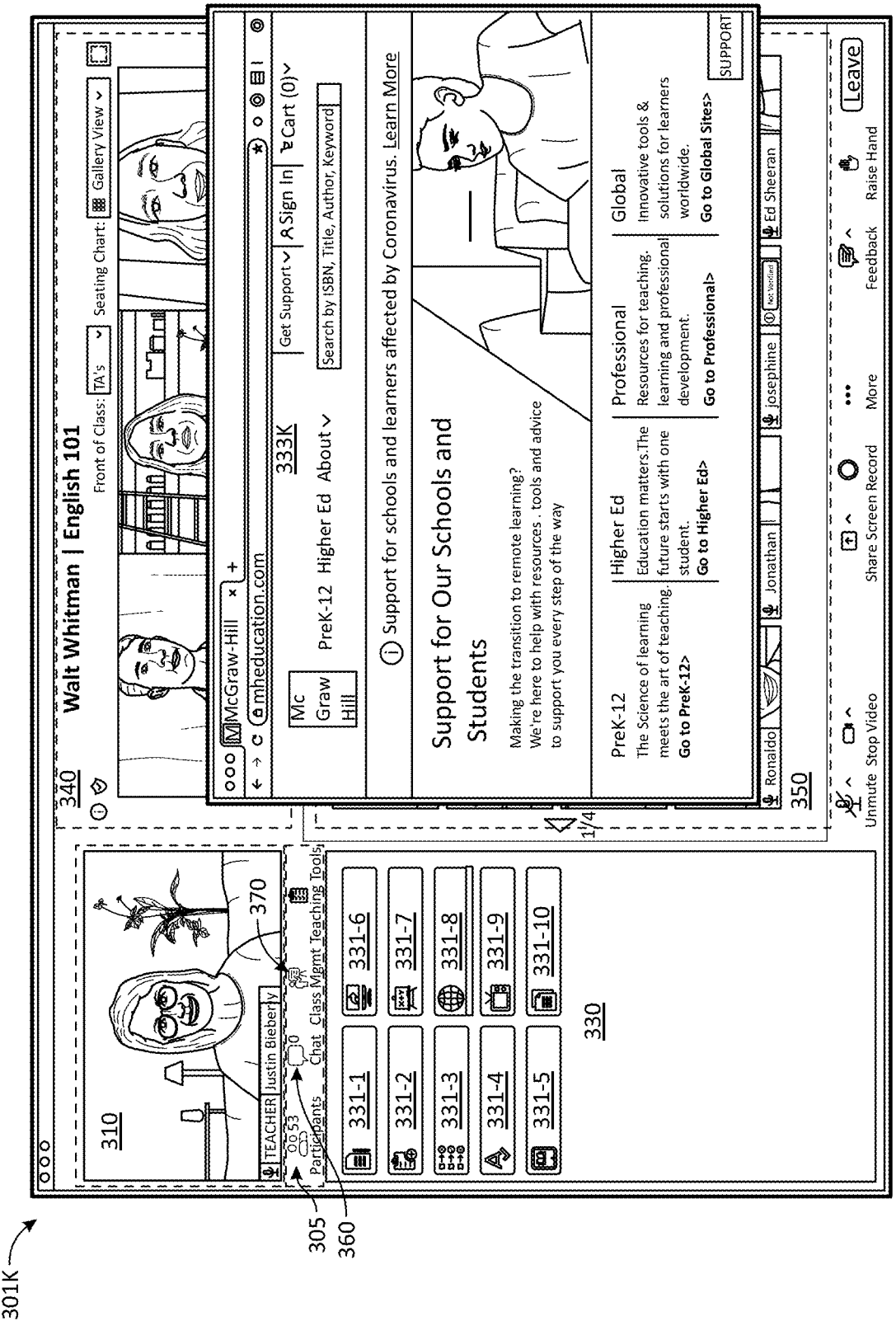

FIG. 3K illustrates classroom 301K, wherein teacher 321 or any one of TAs 342 uses web browsing tool 331-8 to access a web page 333K containing information about a selected subject. The digital content in web page 333K is more interactive and memorable than voluminous textbooks or one-sided lectures. Web page 333K provides better context and allows students 352 to better connect with the learning material. Accordingly, teacher 321 in virtual classroom 301K may push websites and other digital content directly, allowing students 352 to engage with the online content and enrich the experience of virtual classroom 301K.

Figure 3L:
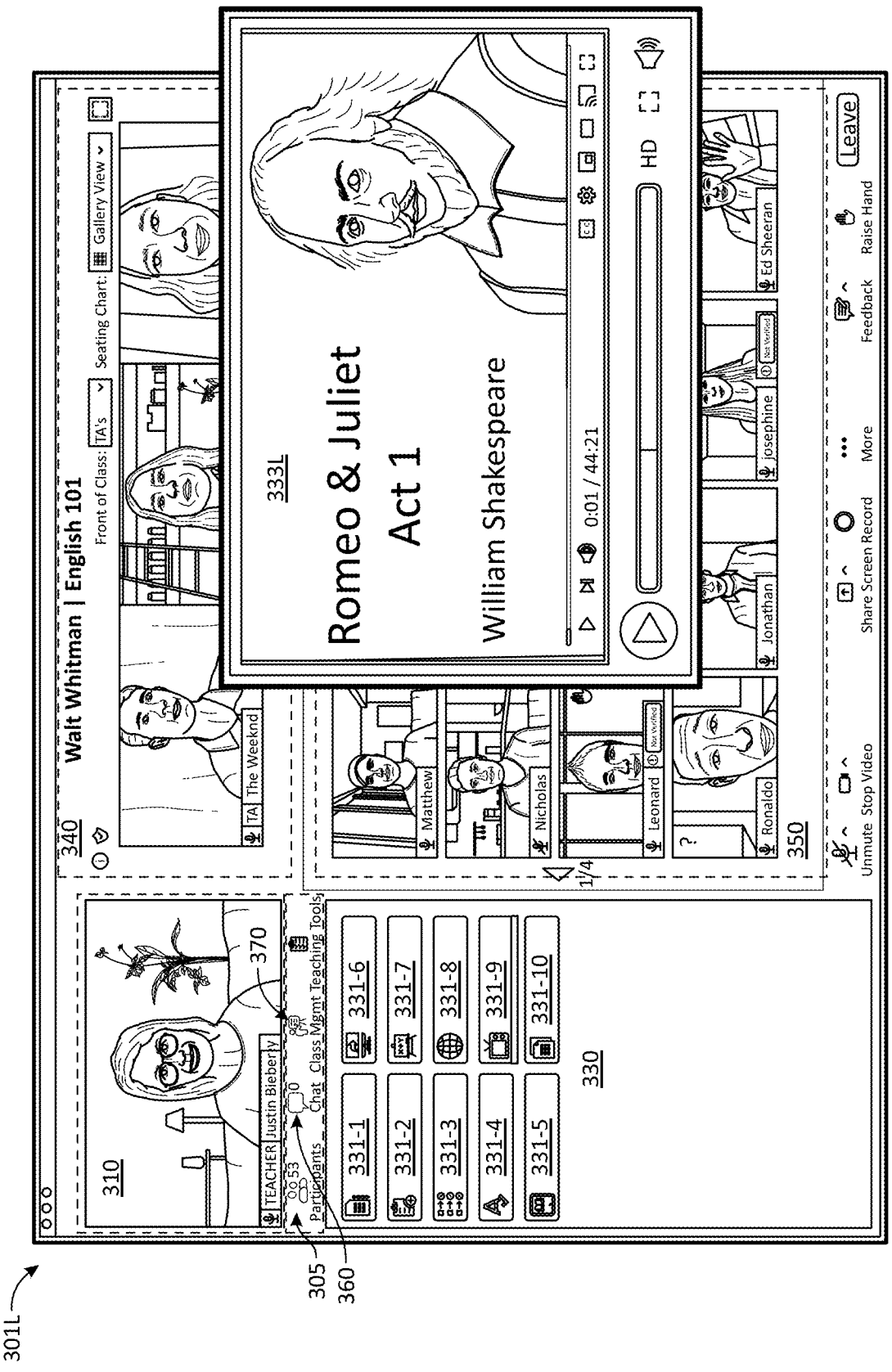

FIG. 3L illustrates classroom 301L, wherein teacher 321 or any one of TAs 342 uses multimedia playing tool 331-9 to show a video 333L to students 352. Virtual classroom 301L enables teacher 321 to incorporate videos, music, and other digital media seamlessly. Teacher 321 and TA's 342 can distribute files to the class for download using file sharing tool 331-10.

FIGS. 4A-H illustrate a student engagement functionality for a virtual classrooms 401A, 401B, 401C, 401D, 401E, 401F, 401G, and 401H (collectively referred to, hereinafter, as "virtual classroom 401"), according to some embodiments. In virtual classrooms 401, participant list 320 includes teacher 321 (shown at podium 310), TA list 323 (video feeds in TA field 340), and students 325 (shown in student field 350).

Figure 4A:
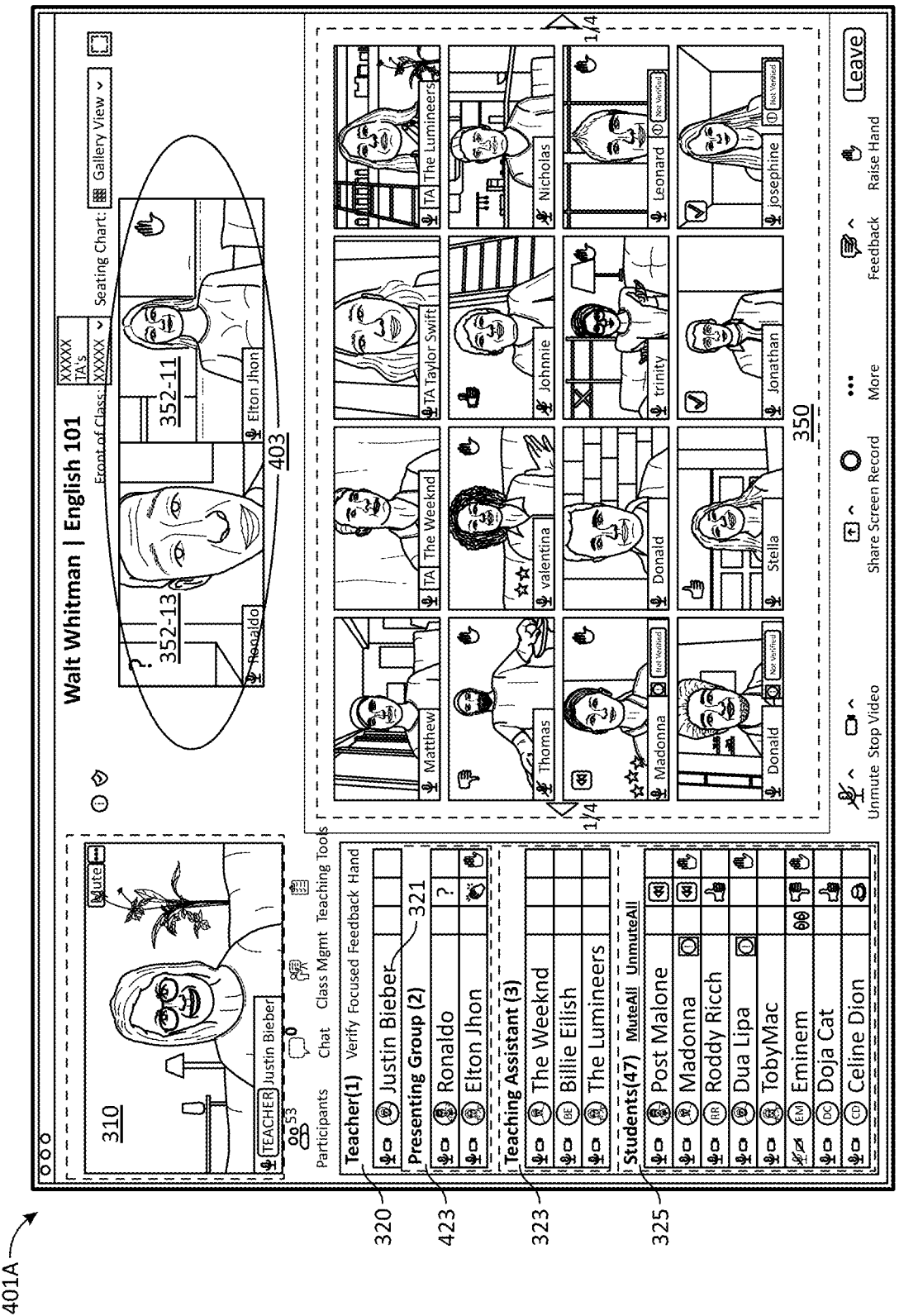
FIGS. 4A-H illustrate a student engagement functionality for a virtual classroom, according to some embodiments.

FIG. 4A illustrates virtual classroom 401A, wherein teacher 321 has made two students presenters 423 and placed them in a front row 403. Teacher 321 moves presenters 423 to the top of the screen to present to the full class. Teacher 321 or any one of TAs 342 can select students (e.g., students 352-11 and 352-13) to present at the front row 403 of virtual classroom 401A.

Figure 4B:
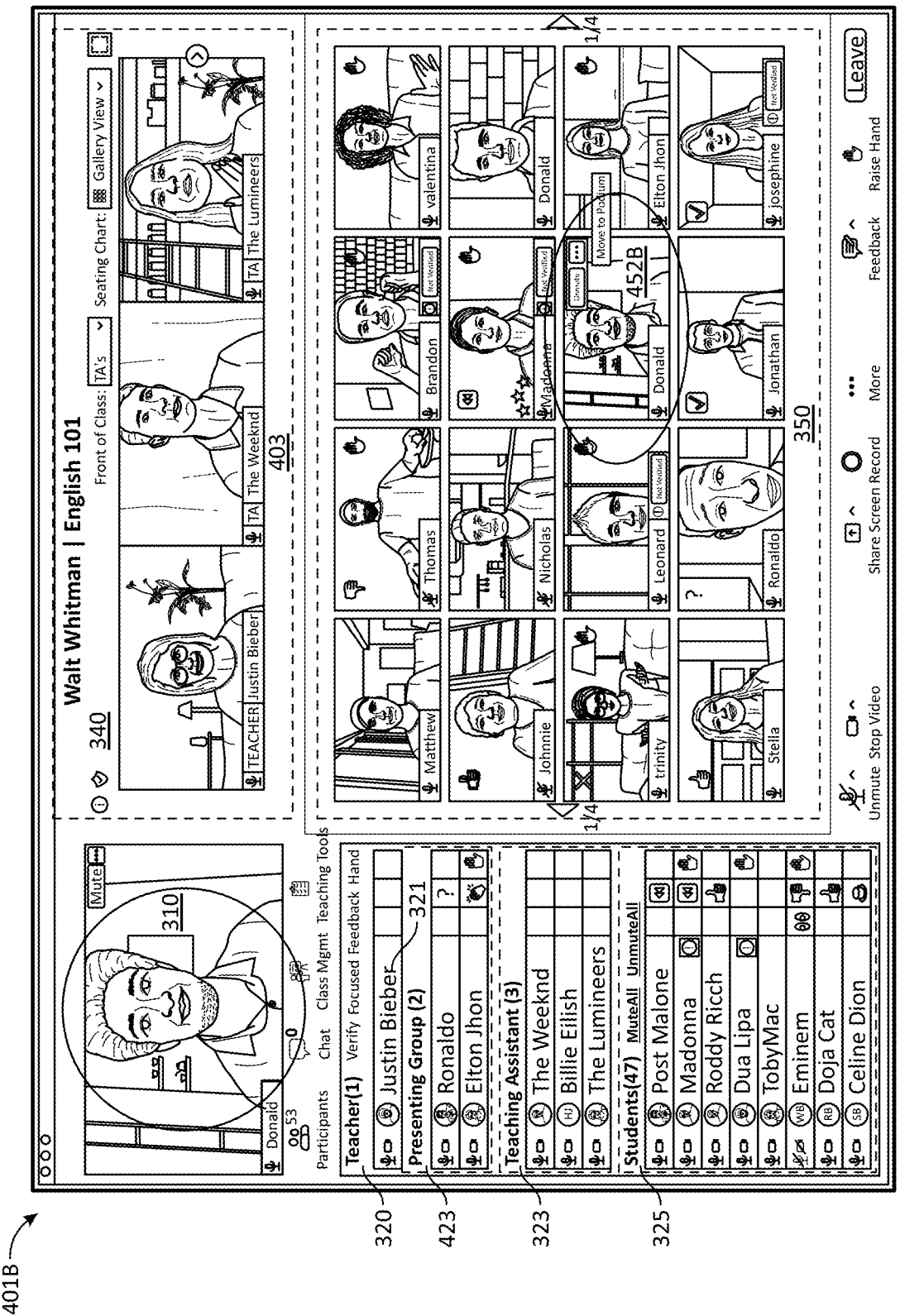

FIG. 4B illustrates virtual classroom 401B, wherein teacher 321 makes a guest lecturer 452B out of one of the students and moves him/her into podium 310.

Figure 4C:
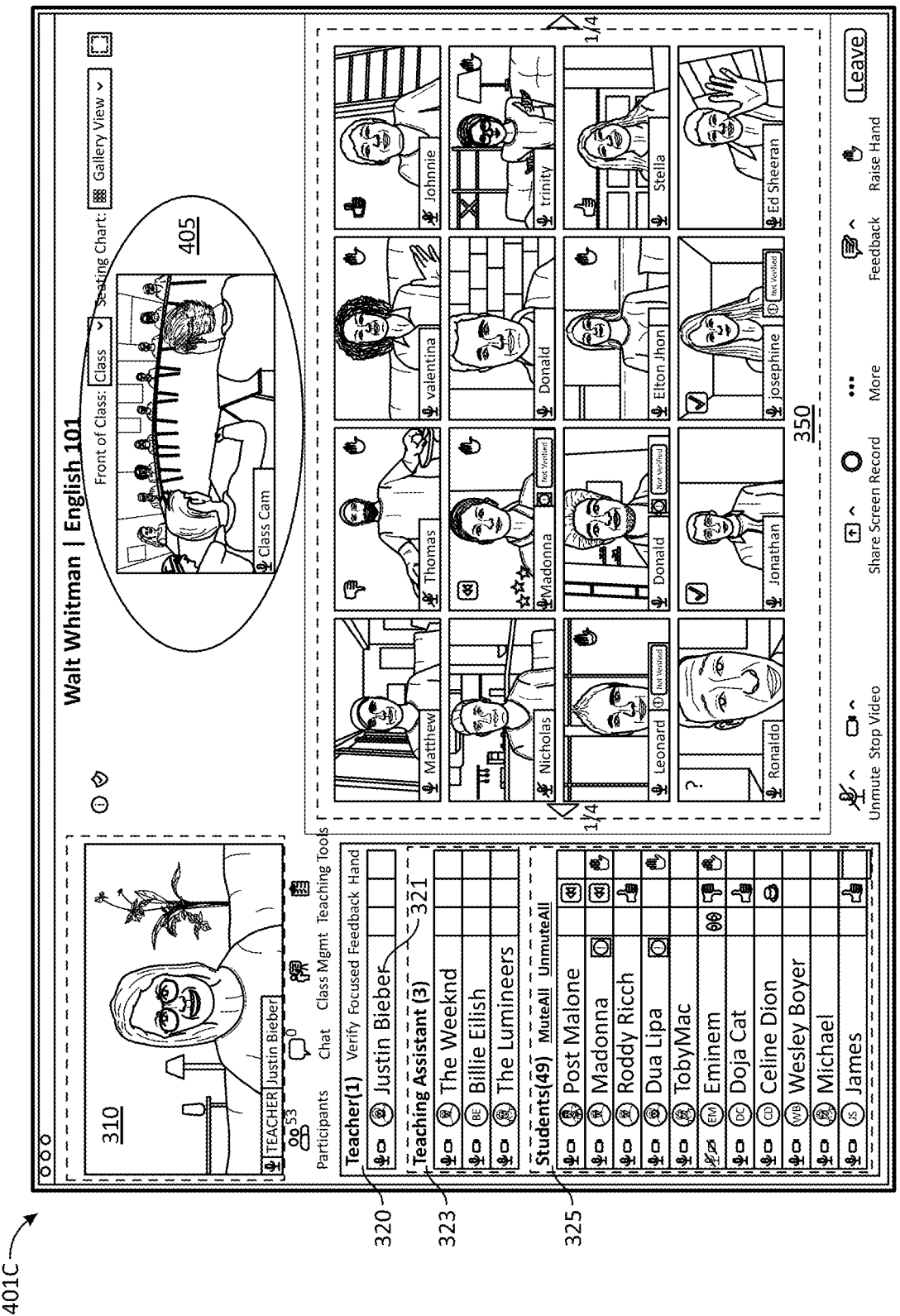

FIG. 4C illustrates virtual classroom 401C, wherein teacher 321 presents in the front of class a web cam view 405 of a physical classroom that may be part of virtual classroom 401C. Such an approach may be desirable in configurations including a mixed class environment wherein a camera can be dedicated to the room. Accordingly, students 325 from home can more easily see what is taking placed in the classroom.

Figure 4D:
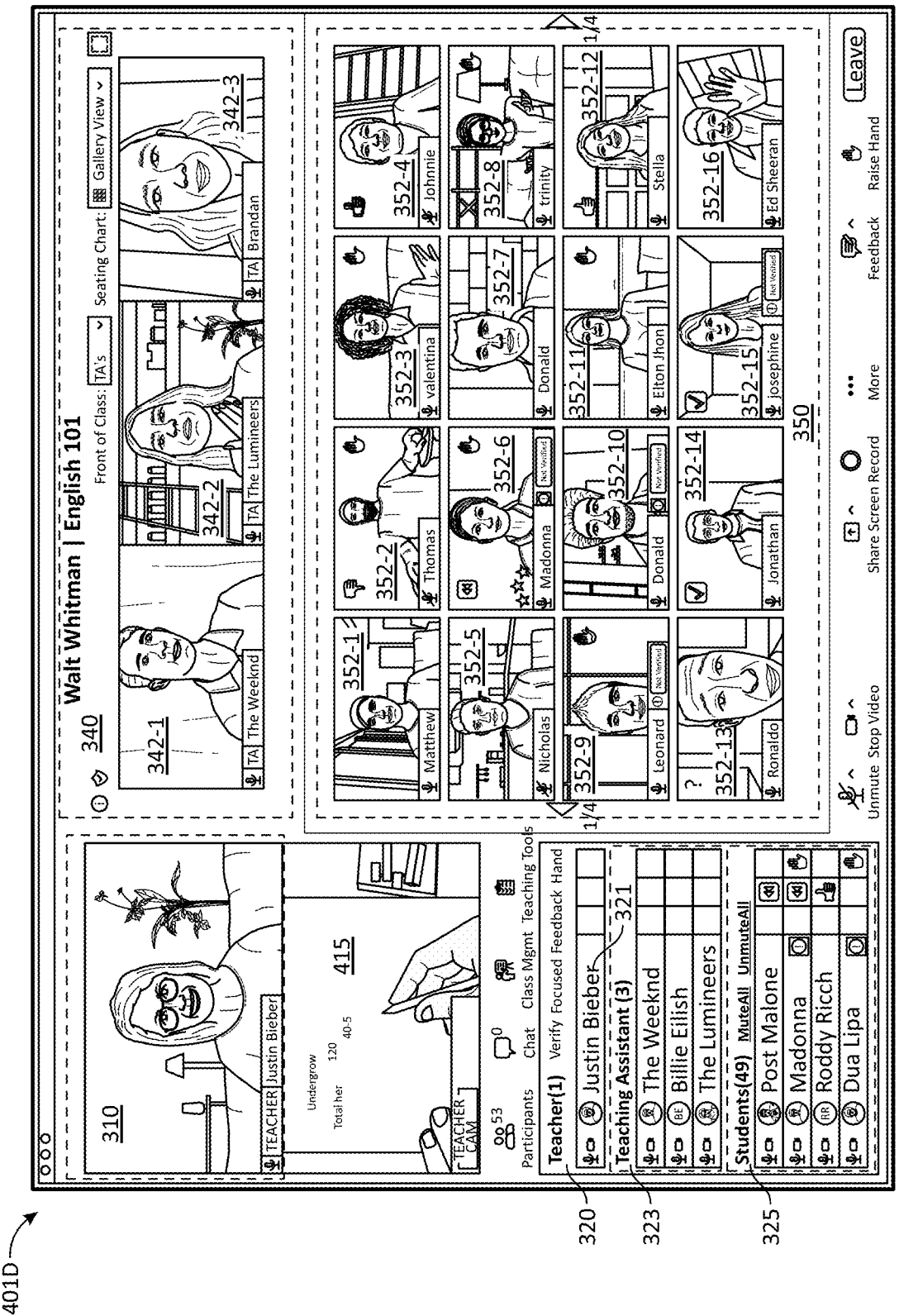

FIG. 4D illustrates virtual classroom 401D, wherein teacher 321 illustrates a feed 415 from a dedicated camera (e.g., a camera pointing to a teacher's desk to illustrate a calculation or note, or handwritten demonstration that teacher 321 desires to make). Feed 415 may include a second video setup as a document viewer or dedicated camera that teacher 321 or any one of TAs 323 may use to illustrate certain aspect of the teaching material.

Figure 4E:
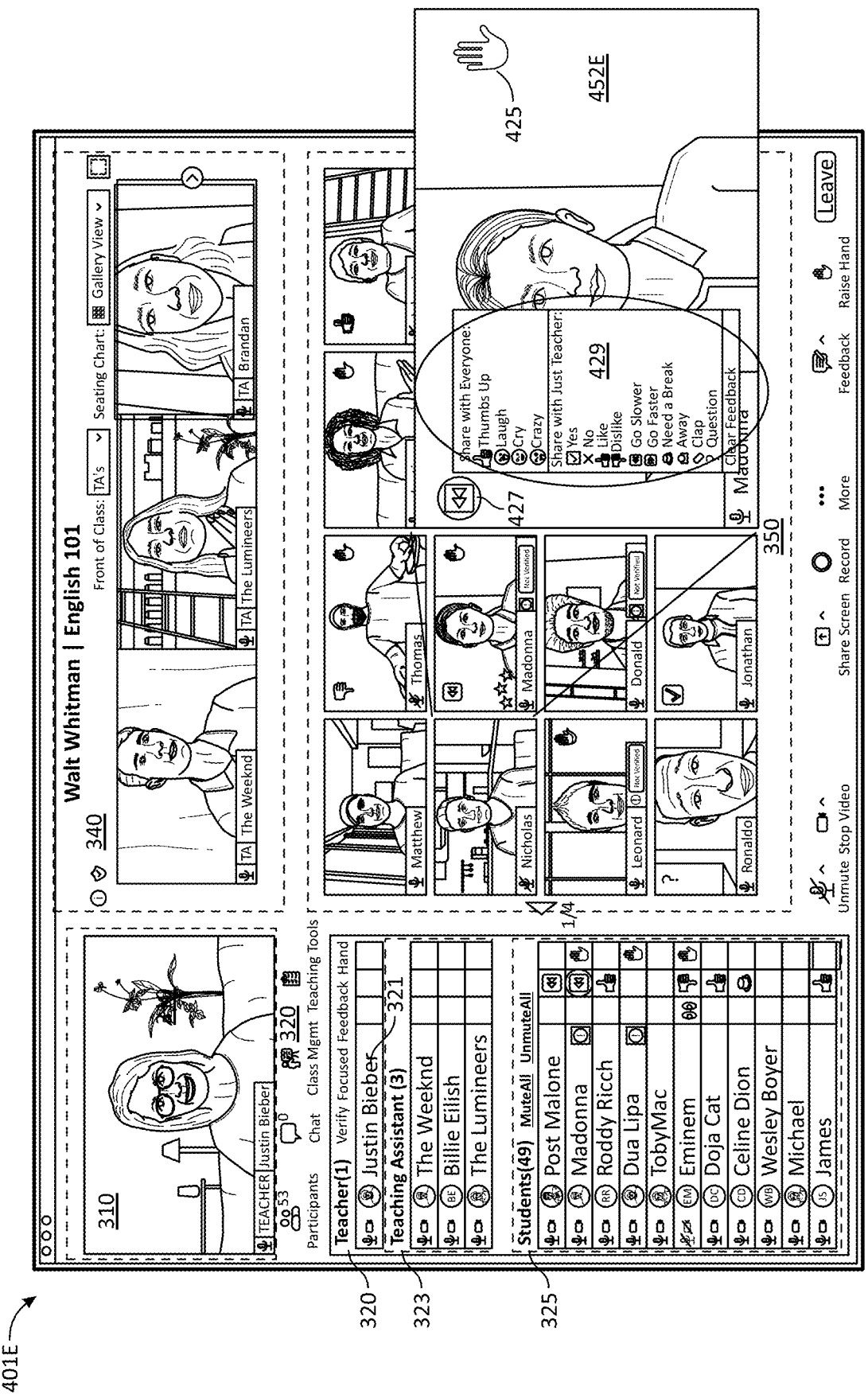

FIG. 4E illustrates virtual classroom 401E, wherein a student 452E has raised her hand (cf icon 425) to provide a feedback 427. For example, using this tool, students 325 can raise their hand 425 when they have a question. Student 452E sees a menu 429 of options for handling feedback 427. In some embodiments, student 452E may decide to share feedback 427 with just the teacher, or with everyone. Menu 429 may also include the type of feedback 427 that student 452E may choose: e.g., a thumbs up/down icon, an emoji (smiling, sad, happy, crazy, and the like). Students 325 can select whether feedback 427 is directed only to the teacher or the whole class.

The options provided in menu 429 by the tool may include a wide range of actions, such as a "Share with Everyone" feedback including thumbs up icons, and a menu of emojis expressing laugh, cry, or crazy thoughts. Menu 429 may include a "Share with Just Teacher (or TAs)" list including short answers ("Yes" or "No"), like, dislike icons, or a request for the teacher to go slower or faster, need a break, away, clap, or ask a question.

Figure 4F:
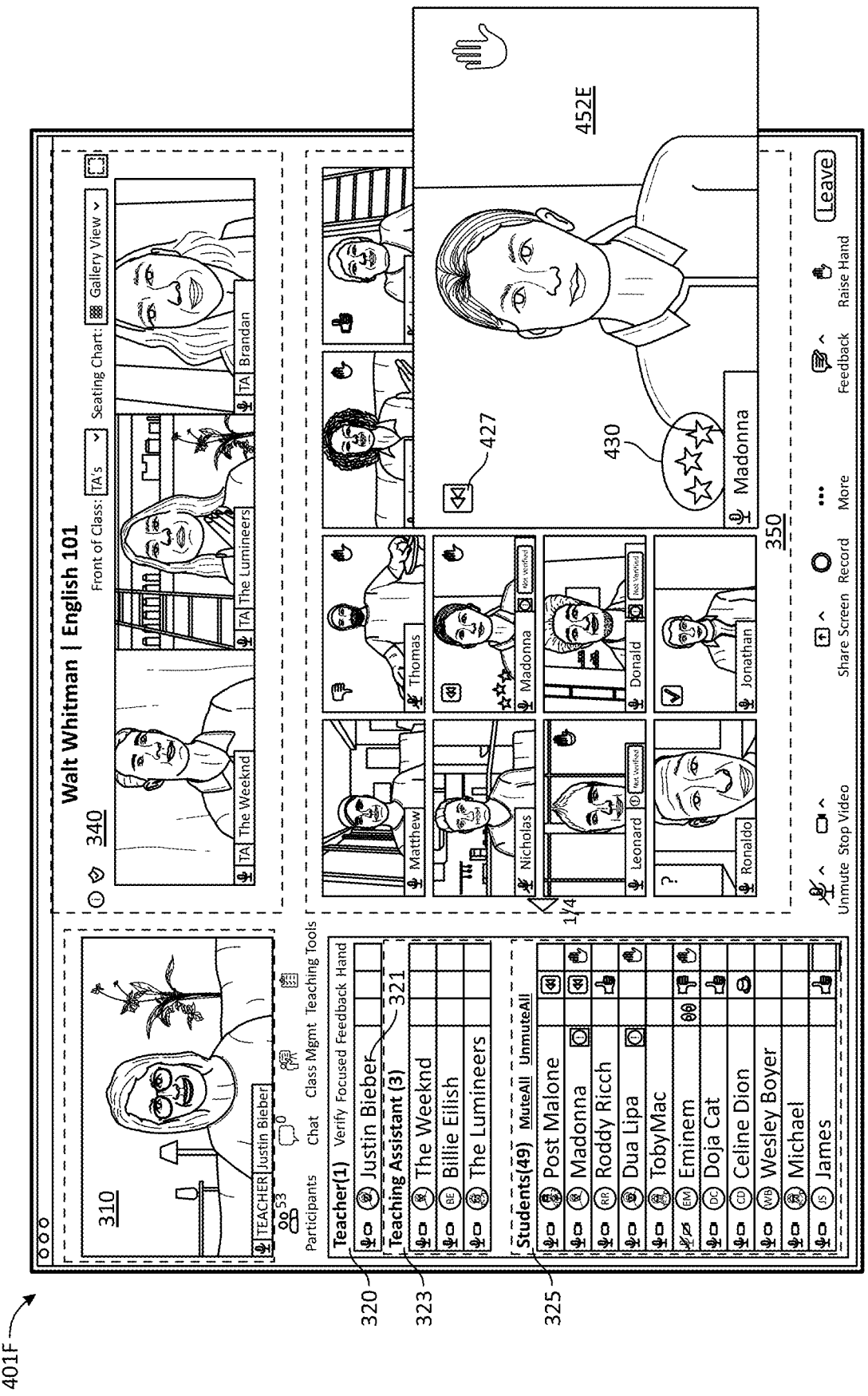

FIG. 4F illustrates virtual classroom 401F wherein teacher 321 awards a prize 430, or extra points, to student 452E after feedback 427. In some embodiments, prize 430 has a star icon to one or more students 325 that stand out in class. In some embodiments, prize 430 may be visible to all students 325 to stimulate participation. In some embodiments, prize 430 may be visible to student 452E, teacher 321, and or at least one of TAs 323.

Figure 4G:
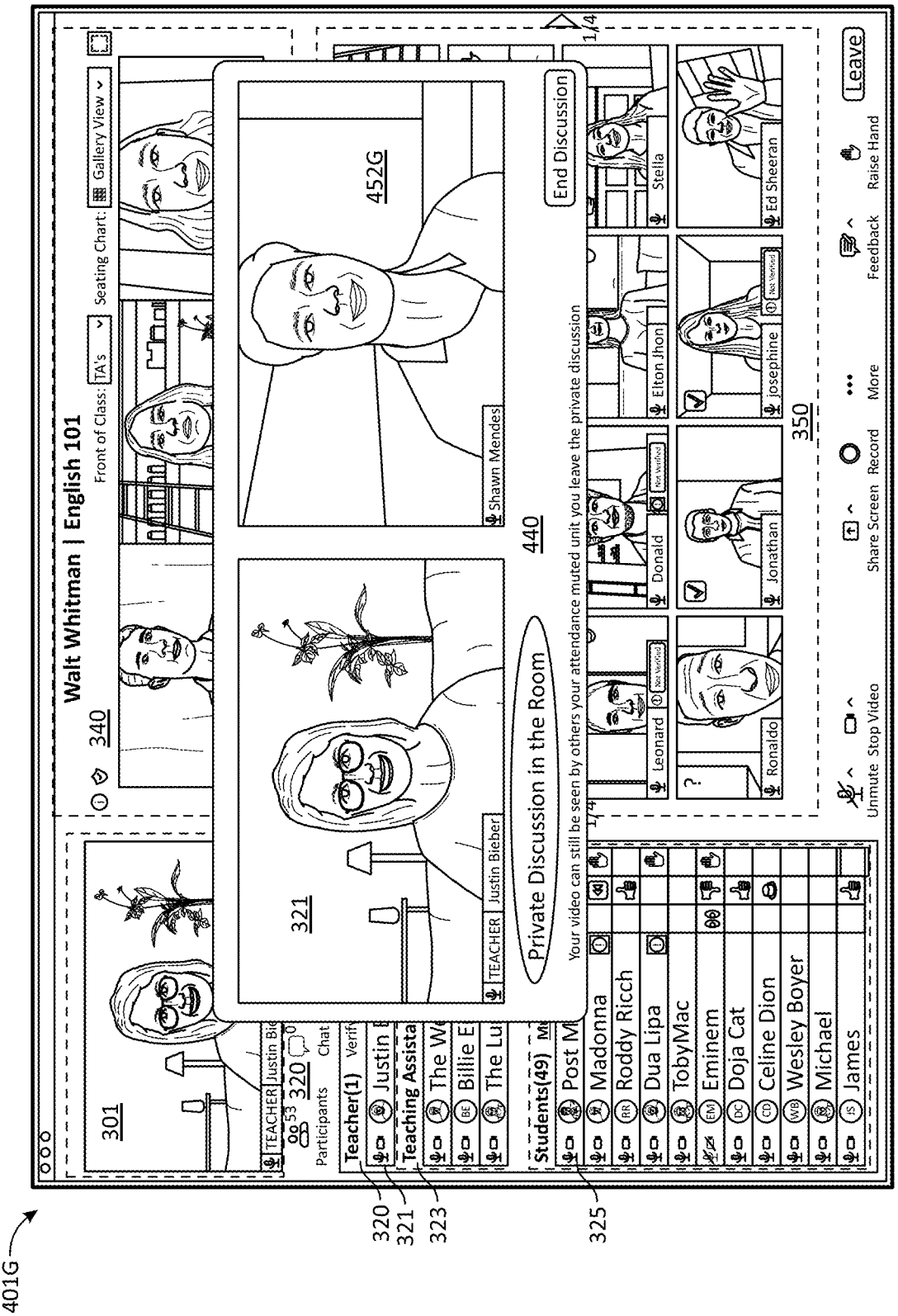

FIG. 4G illustrates virtual classroom 401G, wherein teacher 321 creates a one-on-one live chat 440 with a student 452G. One-on-one chat 440 enables individual live video/audio conversations with just a select individual 452G while in a group virtual chat, without leaving the virtual classroom 401G. In some embodiments, other participants 320 can still see the video feed from teacher 321 and student 452G but cannot hear them "out of the room" (chat 440). In some embodiments, both the audio and video of one-on-one chat 440 are muted for other participants 320 in virtual classroom 401G.

Having the ability for teacher 321 or any one of TAs 323 to speak in private with student 452G via chat 440 during class is a desirable feature not available for an in-person classroom. For students 325 who have IEP or 504 plans, one-on-one chat 440 allows for the special education teacher to spend time and assist with those students during the normal class time.

In some embodiments, teacher 321 or any one of TAs 323 can reach out to have individual one-on one video discussions with any one of students 325. In some embodiments, an "Outside the Room" option includes blocking both the audio AND video in chat 440 from all other participants 320.

Figure 4H:
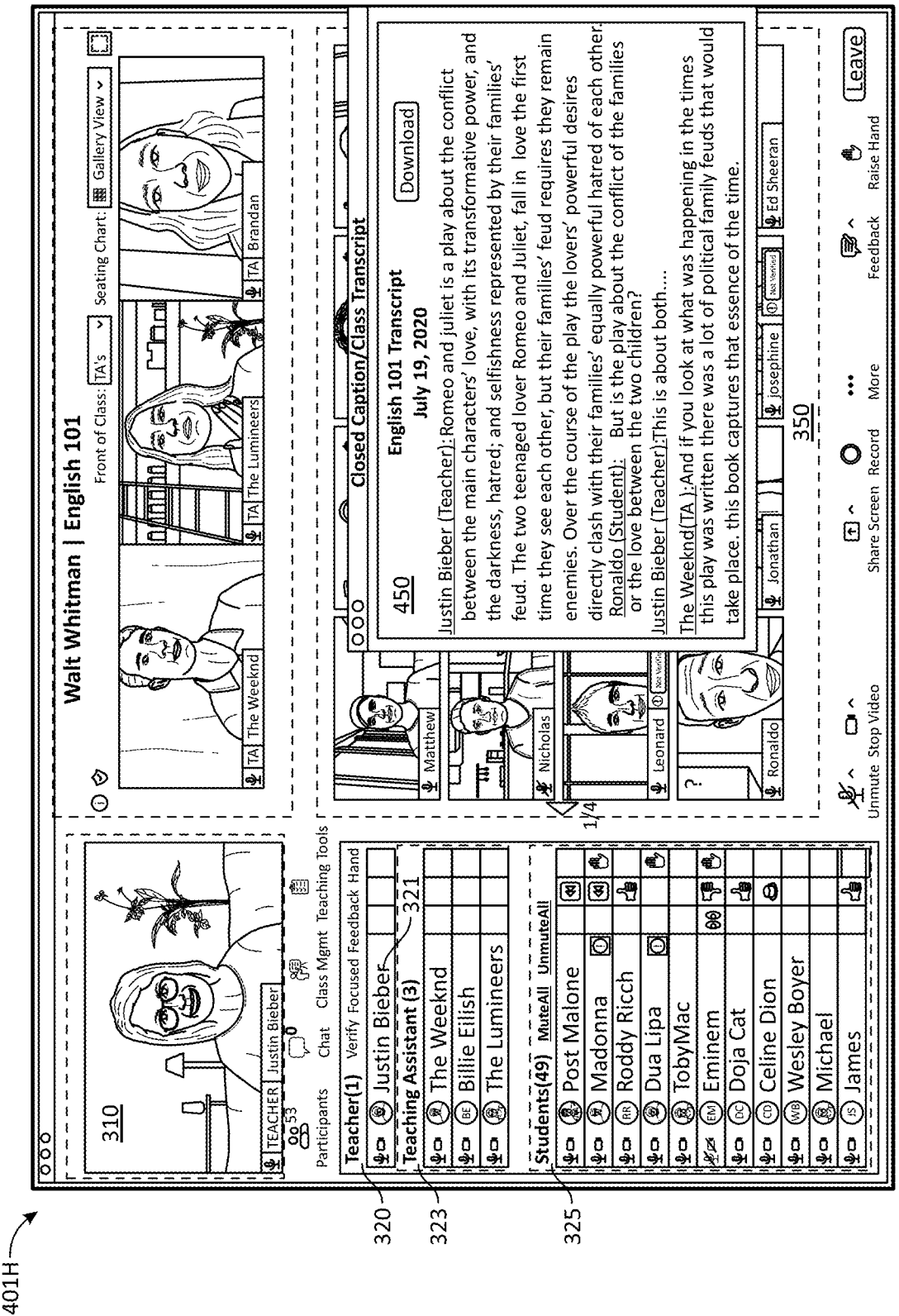

FIG. 4H illustrates virtual classroom 401H, wherein the teacher provides (e.g., at the end of the class) a closed caption class transcript 450 to participants 320. In some embodiments, the classroom engine automatically transcribes the class for closed captioning, so it meets accessibility standards for students 325. In addition, transcript 450 can be downloaded for class notes or for students 325 that have missed the live class.

FIGS. 5A-D illustrate an attendance and identity verification tool for virtual classrooms 501A, 501B, and 501C, (hereinafter, collectively referred to as "virtual classrooms 501"), according to some embodiments. In virtual classrooms 501, participant list 320 includes teacher 321 (shown at podium 310), TA list 323 (video feeds in TA field 340), and students 325 (shown in student field 350). A participation tool 510 lists, for each student 325, a measure or track for the level of engagement of the student with the class.

Figure 5A:
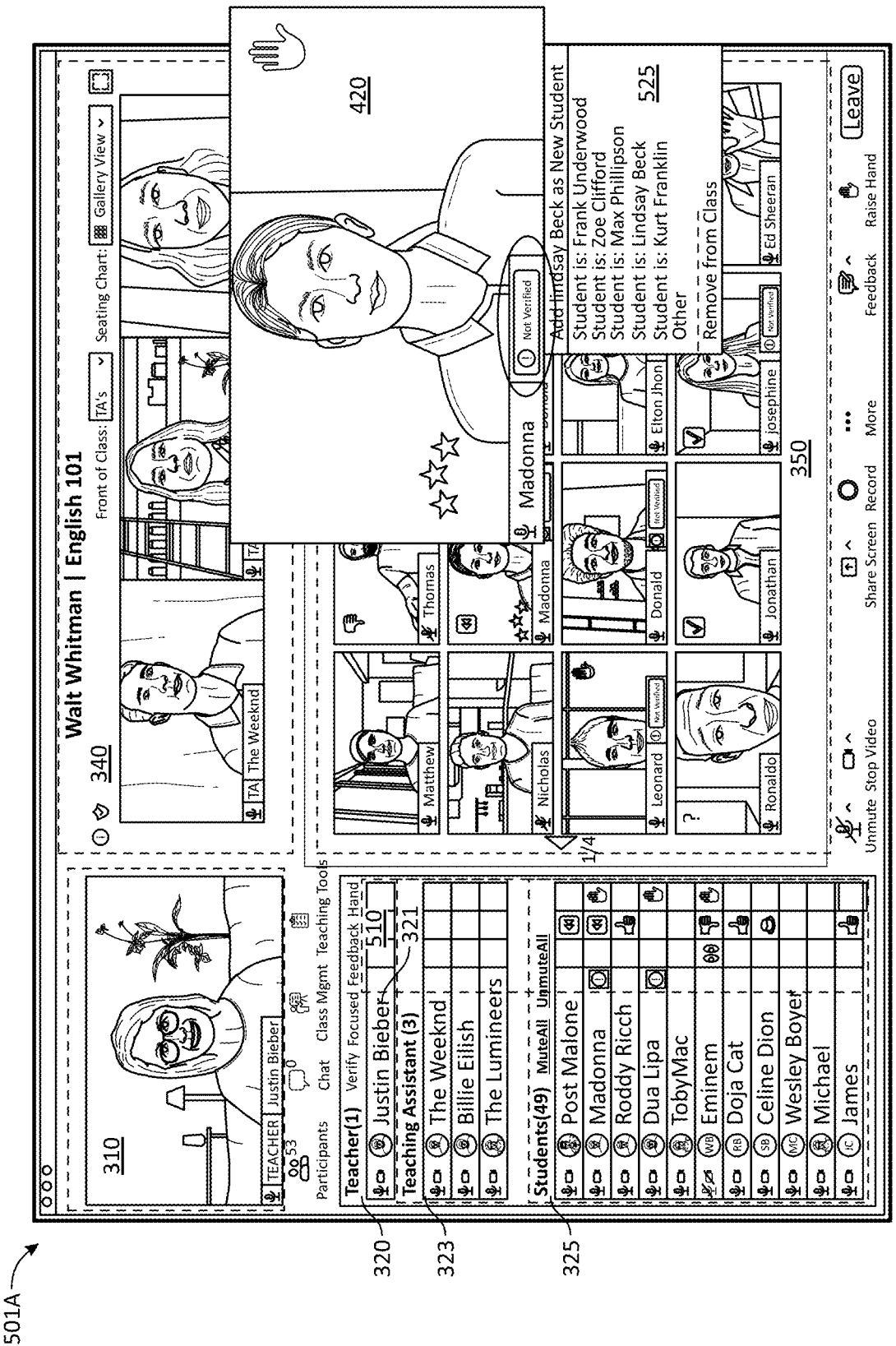

FIG. 5A illustrates virtual classroom 501A including a list 525 of unverified students. The system pulls up a list 525 of registered students that are not yet in the class. In some embodiments, a person in list 525 can be added as a new student. In some embodiments, when a person in list 525 does not belong, they can be removed from the class. Once persons in list 525 are verified, they will be automatically verified in the future. In some embodiments, an automatic facial recognition algorithm may be applied to the video feed on any one of students 352 for automatic verification. In some embodiments, teacher 321 or any one of TAs 323 may verify the identity of a student 325 manually.

Figure 5B:
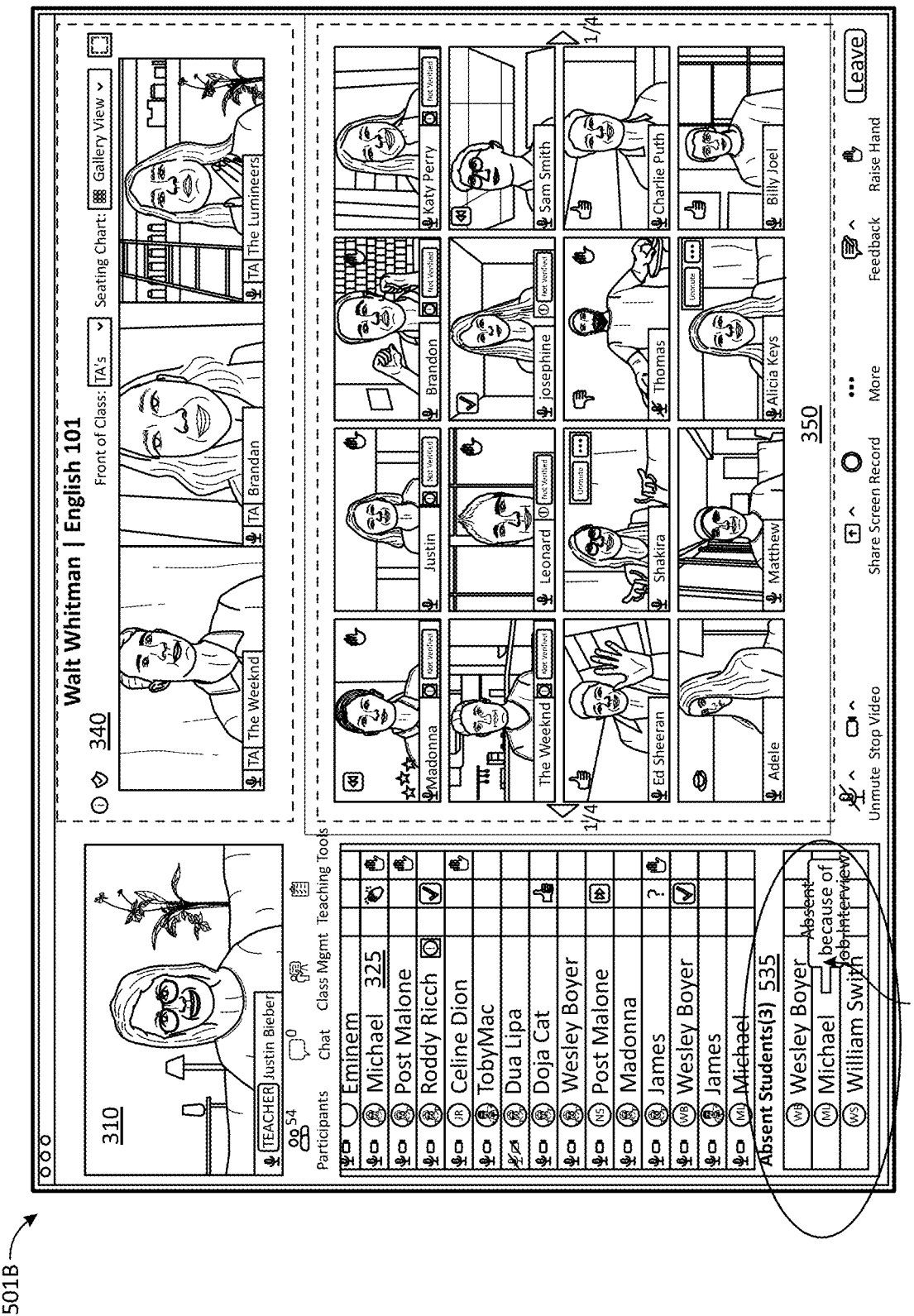

FIG. 5B illustrates virtual classroom 501B, including a list 535 of absent students. List 535 includes students that are not yet in the class (e.g., logged in) to make it easy for teacher 321 and TAs 323 to understand who is attending and who is absent. Students in list 535 can provide the reason they aren't in class, which can be viewed as a balloon 537 that pops up when a mouse or pointer from teacher 321 or TAs 323 hovers over the name.

Figure 5C:
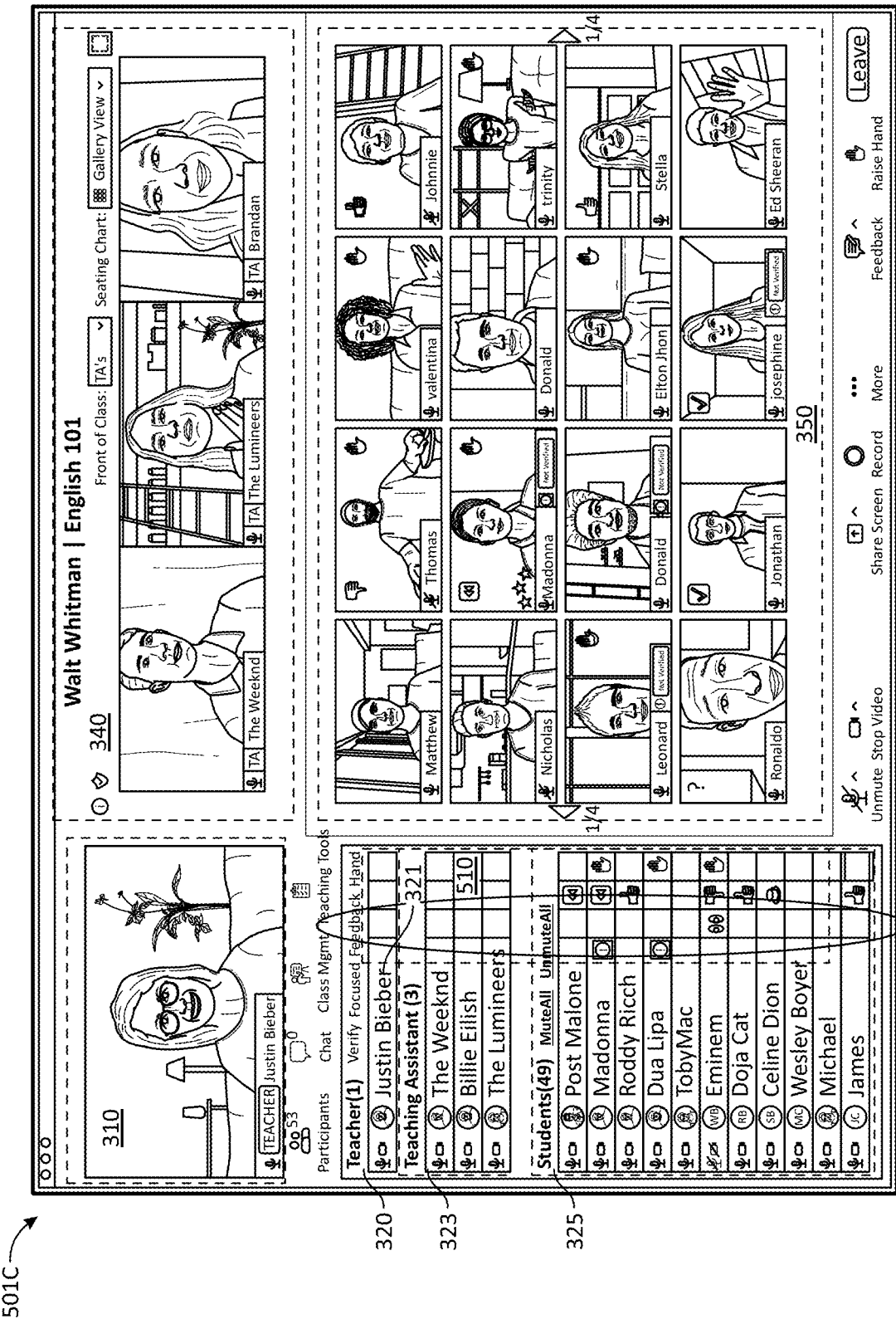

FIG. 5C illustrates virtual classroom 501C, wherein teacher 321 may look at a focus tracking column 545 in attention tool 510 to address students that seemingly lack attention during the class, in real-time. In some embodiments, tracking column 545 may be provided by a tracking tool, as disclosed herein (e.g., tracking tool 244). Focus tracking column 545 may indicate an attention value for each student and include a statistical result. For example, in some embodiments, column 545 may rank students 325 by: below average attention (red), average attention (orange), and above average attention (green). In some embodiments, students 325 are sorted on screen group 350 by participation level. In some embodiments, attention tool 510 includes attendance values such as average or last five (5) classes, and the like. In some embodiments, the tracking tool enables teacher 321 and TAs 323 to see if a student does not have a Virtual Classroom application as their primary (in-focus) application on the screen (e.g., application 222 active in a client device 110 used by the student). This allows teacher 321 to re-engage with the student to make sure they are focused on the class at hand.

Figure 5D:
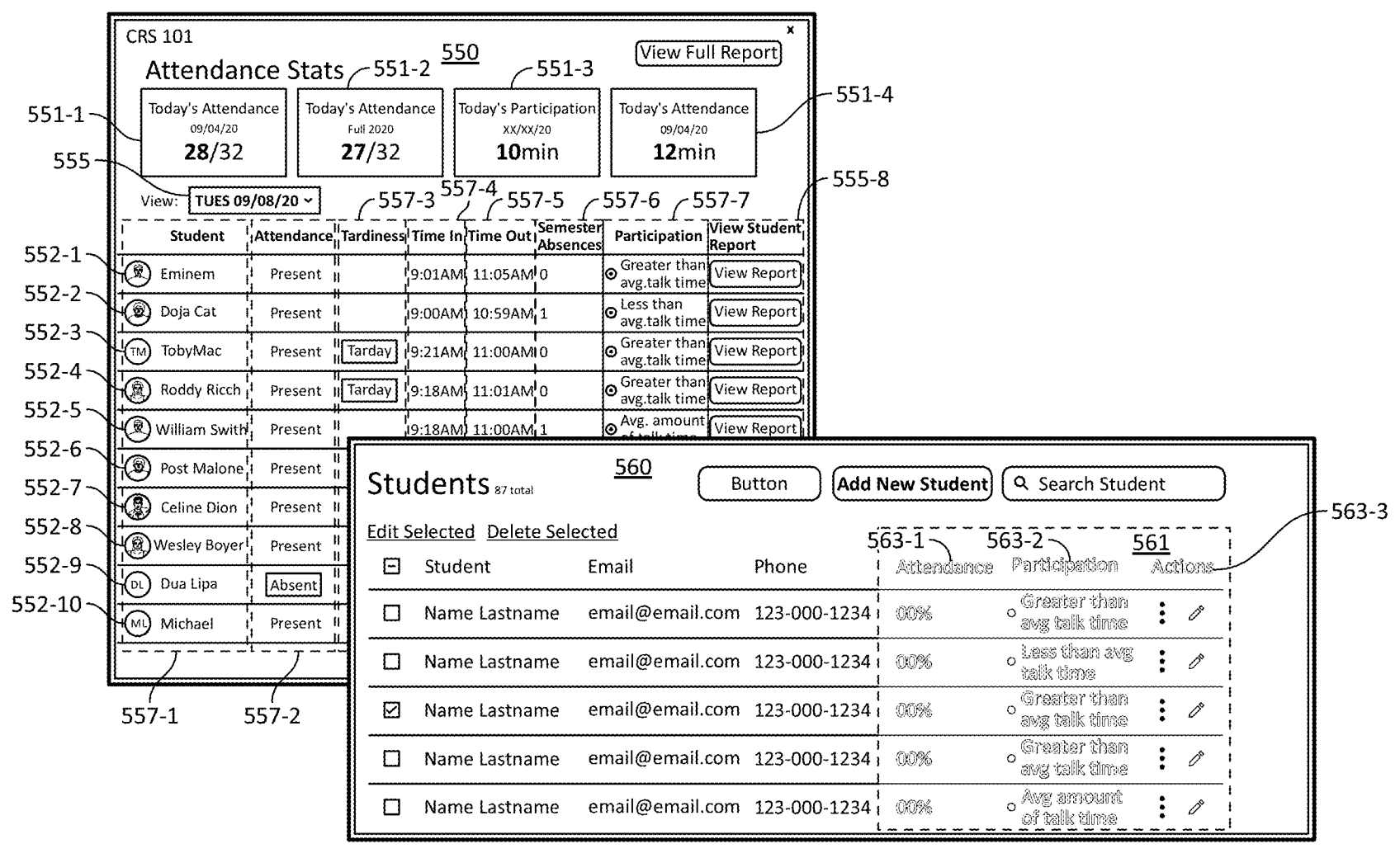

FIG. 5D illustrates an attendance statistics table 550 available to teacher 321. In some embodiments, the tracking tool includes an attendance module that tracks whether students are absent from a class, when the students enter and leave a class, the amount they participate (talk) in a class, and the amount the Virtual Classroom application is the primary focus on their computer. Statistics table 550 gives teacher 321 insight into which students are focused on the class and which may need additional engagement.

Table 550 includes a current attendance indicator 551-1, an average attendance indicator 551-2, a current participation time 551-3, and an average participation time 551-4. Table 550 also includes an individual list of students 552-1, 552-2, 552-3, 552-4, 552-5, 552-6, 552-7, 552-8, 552-9, and 552-10 (hereinafter, collectively referred to as "students 552"). Table 550 includes columns 557-1 ('student name'), 557-2 ('attendance'), 557-3 ('tardiness'), 557-4 ('time in'), 557-5 ('time out'), 557-6 ('semester absences'), 557-7 ('participation'), and 557-8 ('view report,' hereinafter, collectively referred to as "columns 557"). Table 550 includes a tab 555 to select a specific day or class, to show the attendance statistics.

Teacher 321 may also have access to a detailed student list 560 including contact information for each student (e.g., e-mail, phone number, address, and the like). List 560 provides a field 561 listing an attendance value 563-1, a participation value 563-2, and an actions value 563-3, for each of the students.

Student ID Verification: When a student logs into the class for the first time they may be verified and authorized by either the teacher or a teaching assistant. In some embodiments, a verification feature may include a visual verification that the student is indeed who is supposed to be in the class meeting. When a student is verified, a cookie may be dropped on their computer. When a student with the same name logs in from the same computer for the same class, then they are recognized and automatically verified into the class. When a student uses a different name, or accesses the class from a different client device, they may be re-verified. When the teacher or teaching assistant verifies the student, the verification feature provides a list of names of people that are not currently in the class roster or that cannot be verified. In some embodiments, the teacher or teaching assistant may add an unverified participant as a new member of the class. In some embodiments, the teacher or a teaching assistant may be granted the privileges to expel a participant from the class environment.

Figure 6A:
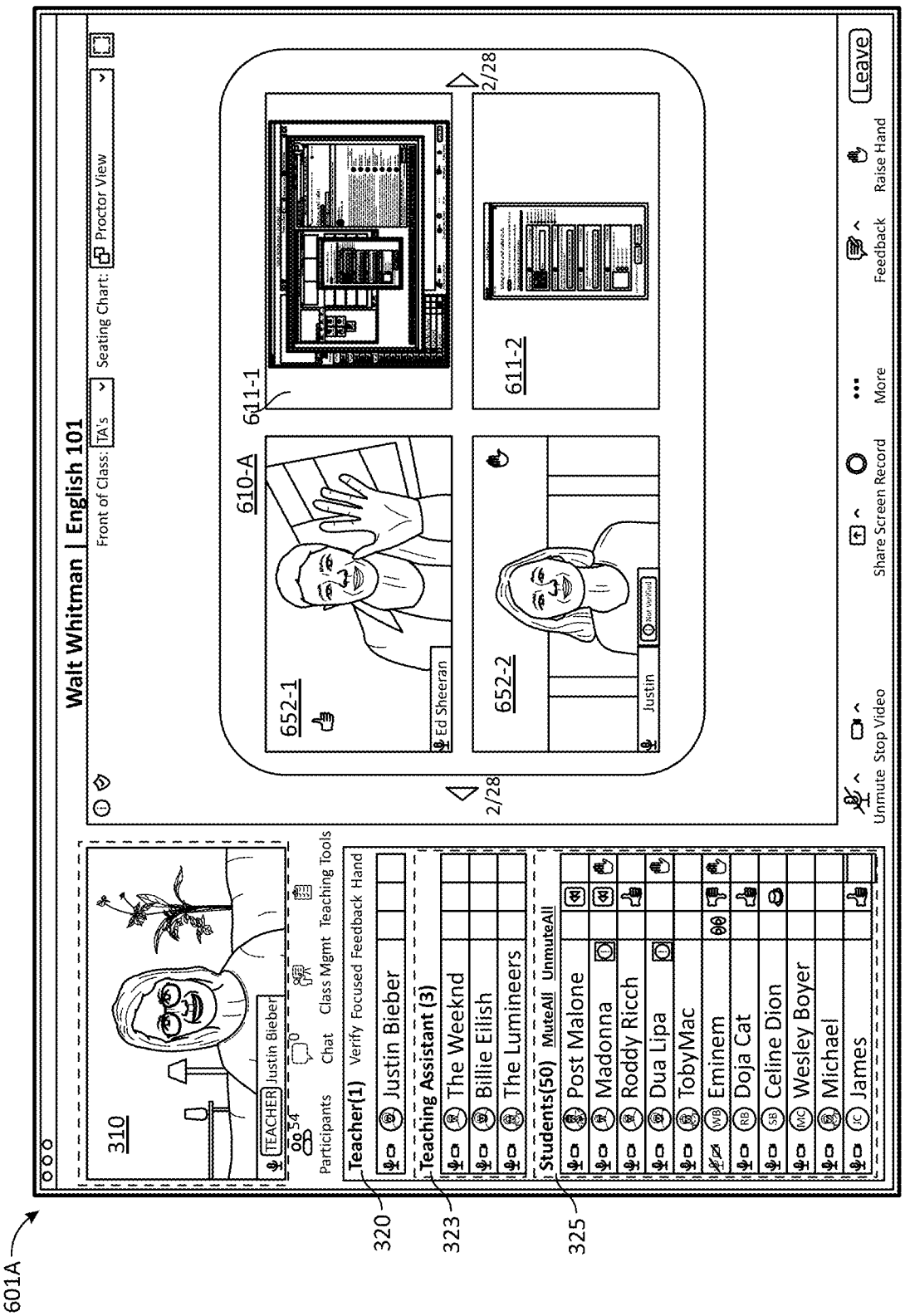
FIGS. 6A-B illustrates a proctoring assignment and exam tool for a virtual classroom, according to some embodiments.
Figure 6B:
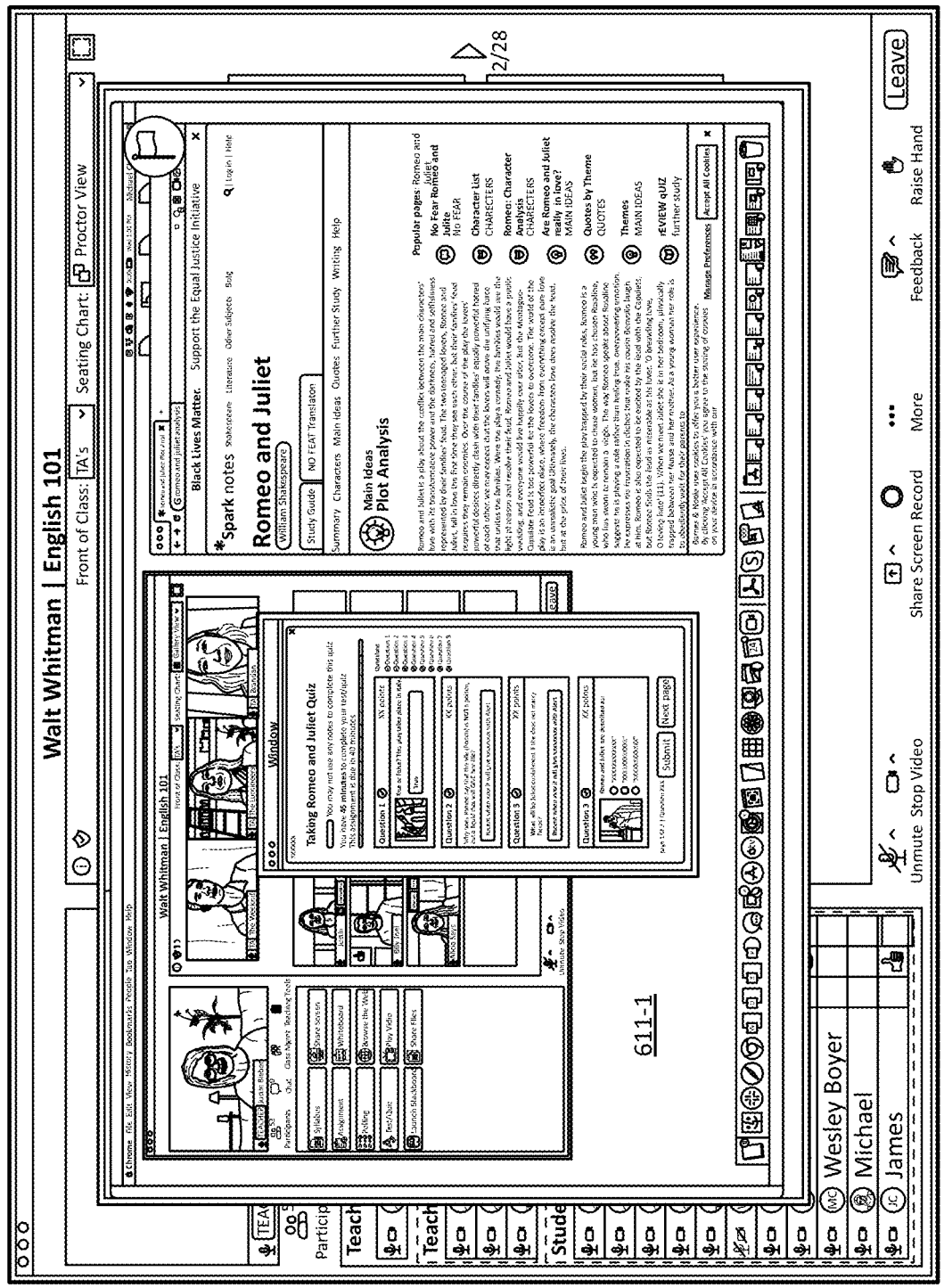

FIGS. 6A-B illustrates virtual classrooms 601A and 601B (hereinafter, collectively referred to as "virtual classrooms 601") a proctoring assignment and exam tool for a virtual classroom, according to some embodiments.

FIG. 6A illustrates virtual classroom 601A, participant list 320 includes teacher 321 (shown at podium 310), TA list 323 and students 325 in a proctor view 610A. Proctor view 610A enables teacher 321 and TAs 323 to see a list of the live video feeds of all the students in the class next to a small picture of their full screen, while proctoring an exam or quiz, or any other class exercise. The teacher or teaching assistant can click on the screen to see live what each of the students is doing. The feature enables the teacher and teaching assistant to flag it as something to examine later and the video clip will be saved for later review and access.

Students 652-1 and 652-2 are shown side by side with a full view of their monitor 611-1 and 611-2, respectively. Clicking on screen 610A, teacher 321 or any one of TAs 323 can zoom in on a higher resolution photo 611-1 so they can check for cheating. Screenshots of proctor view 610A are saved for later access or viewing by the Teachers and TAs.

FIG. 6B illustrates a zoomed out version of monitor 611-1 from one of the students taking a quiz. Thus, teacher 321 can quickly flag or annotate a question they have to come back and fully review later or ask student 652-1 about it.

FIGS. 7A-H illustrate virtual classrooms 701A, 701B, 701C, 701D, 701E, 701F, 701G, and 701H (hereinafter, collectively referred to as "virtual classrooms 701") including multiple aspects of a management tool for a virtual classroom, according to some embodiments.

Figure 7A:
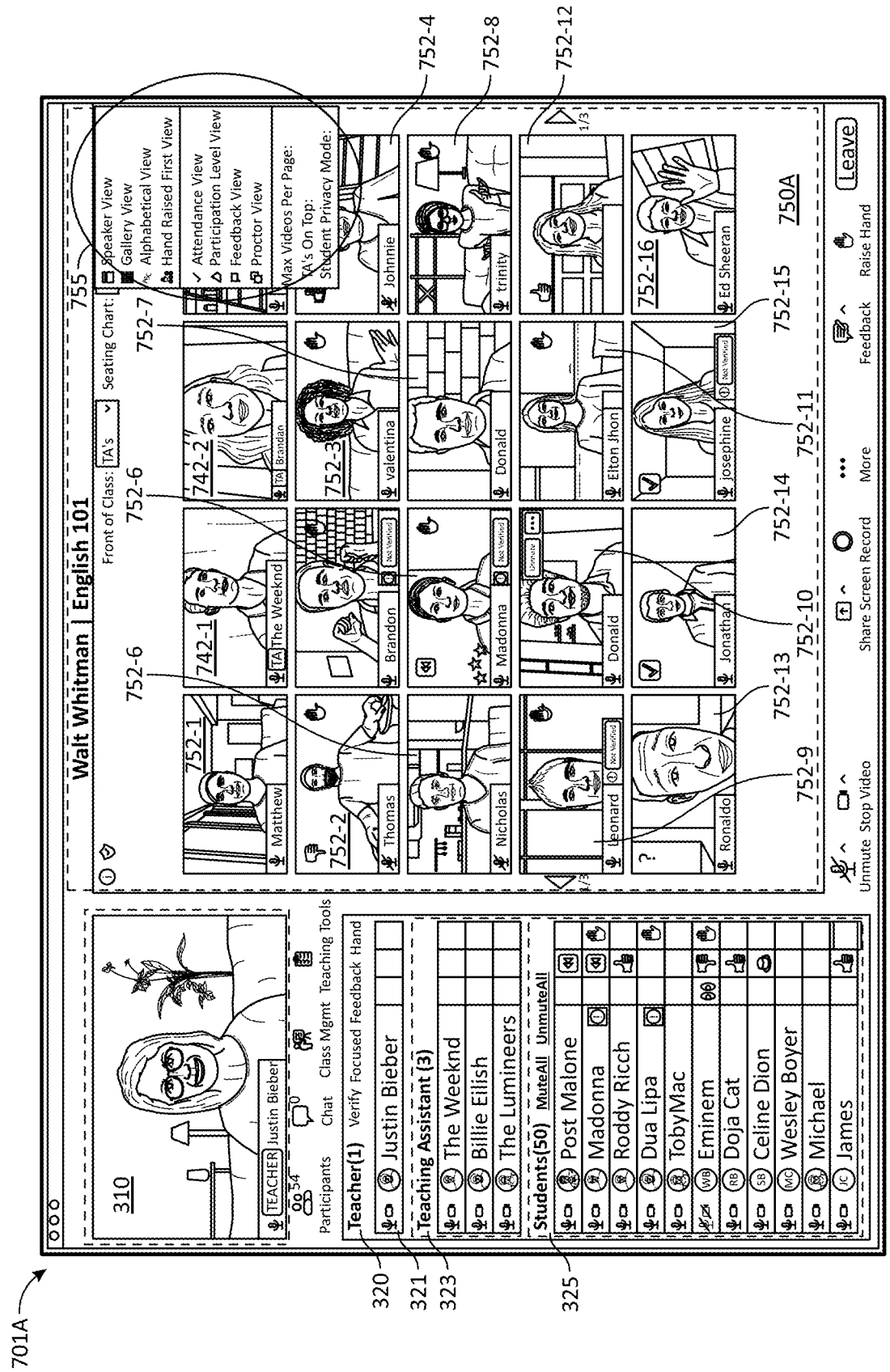

FIG. 7A includes virtual classroom 701A, which may include several features, such as a gallery view 750A wherein participants 320 are sorted alphabetically according to a hand raised (when applicable). Virtual classroom 701A may include additional features 755 for teacher 321 and TAs 323, such as attendance, participation level, feedback, or proctor view.

Figure 7B:
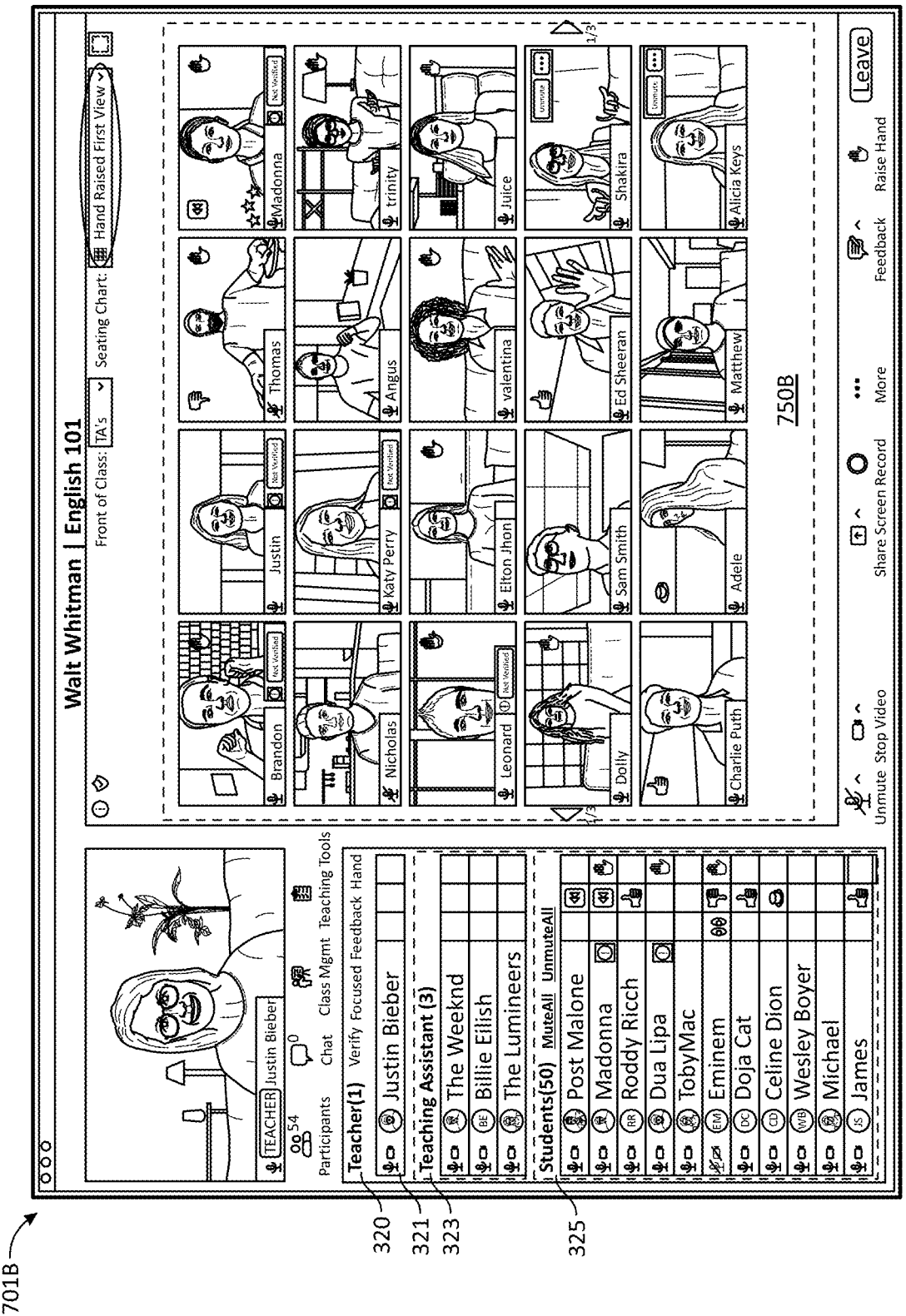

FIG. 7B includes virtual classroom 701B wherein gallery view 750B sorts students 325 alphabetically, by hand raised first. This feature gives teacher 321 the ability to know who to call on and who has been waiting to ask a question the longest. In some embodiments, gallery view 750B sorts the videos in alphabetical order, by hand raised (by whomever raised their hands first), by feedback (whoever gave recent feedback), by attendance (non-verified people first), by participation level (in order of least participation to most participation in the class), or by a user-selected criterion. The user accessing this feature may include teacher 321 or any one of TAs 323, or an administrator in the academic institution hosting, leasing, or contracting the classroom engine.

Figure 7C:
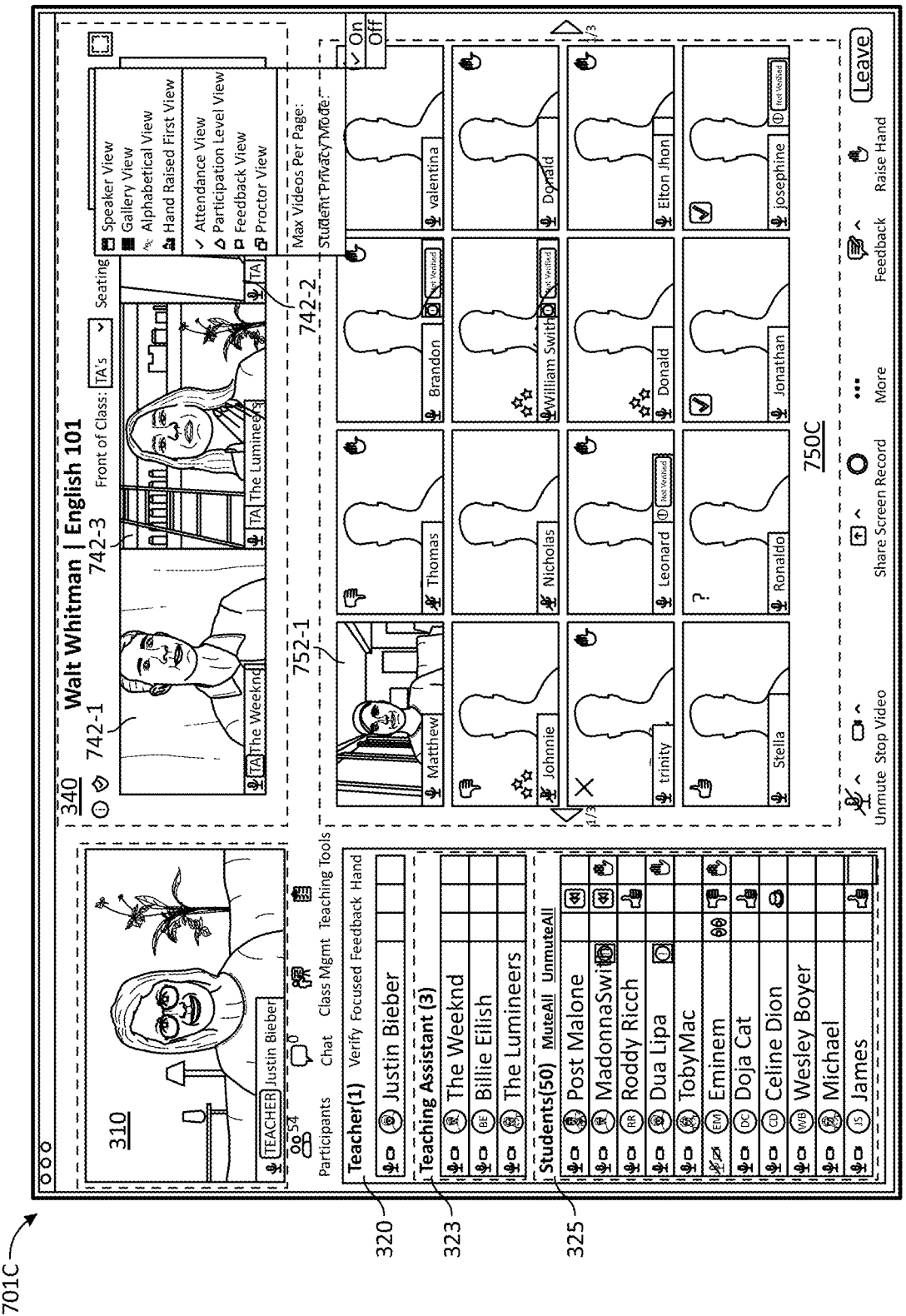

FIG. 7C includes virtual classroom 701C including a gallery 750C wherein a student 752-1 only can see his/her video feed. This feature may apply restrictions such as only allowing selected participants (e.g., teacher 321 and TAs 323) to see all students 325. Every other student can only see teacher 321, TAs 323, and themselves. When recording a class an option to (1) record the whole class video and audio, (2) only record full video and audio for the teachers and teaching assistants and only the audio for the students, or (3) record the full video and audio for the teachers and teaching assistants and nothing for the students.

In some embodiments, a student privacy feature is enabled wherein only teacher 321 and TAs 323 can see students 325. Students 325 can only see themselves, teacher 321, and TAs 323. When classes are recorded for later access, teacher 321 has the ability to have the class recorded without any student video showing and/or audio.

FIGS. 7D-H illustrate a class management feature 750 including an attendance tracking tool 755-1, a gradebook tool 755-2, a breakout groups tool 755-3, a settings tool 755-4, and a teacher training tool 755-5 (hereinafter, collectively referred to as "management tools 755").

Figure 7D:
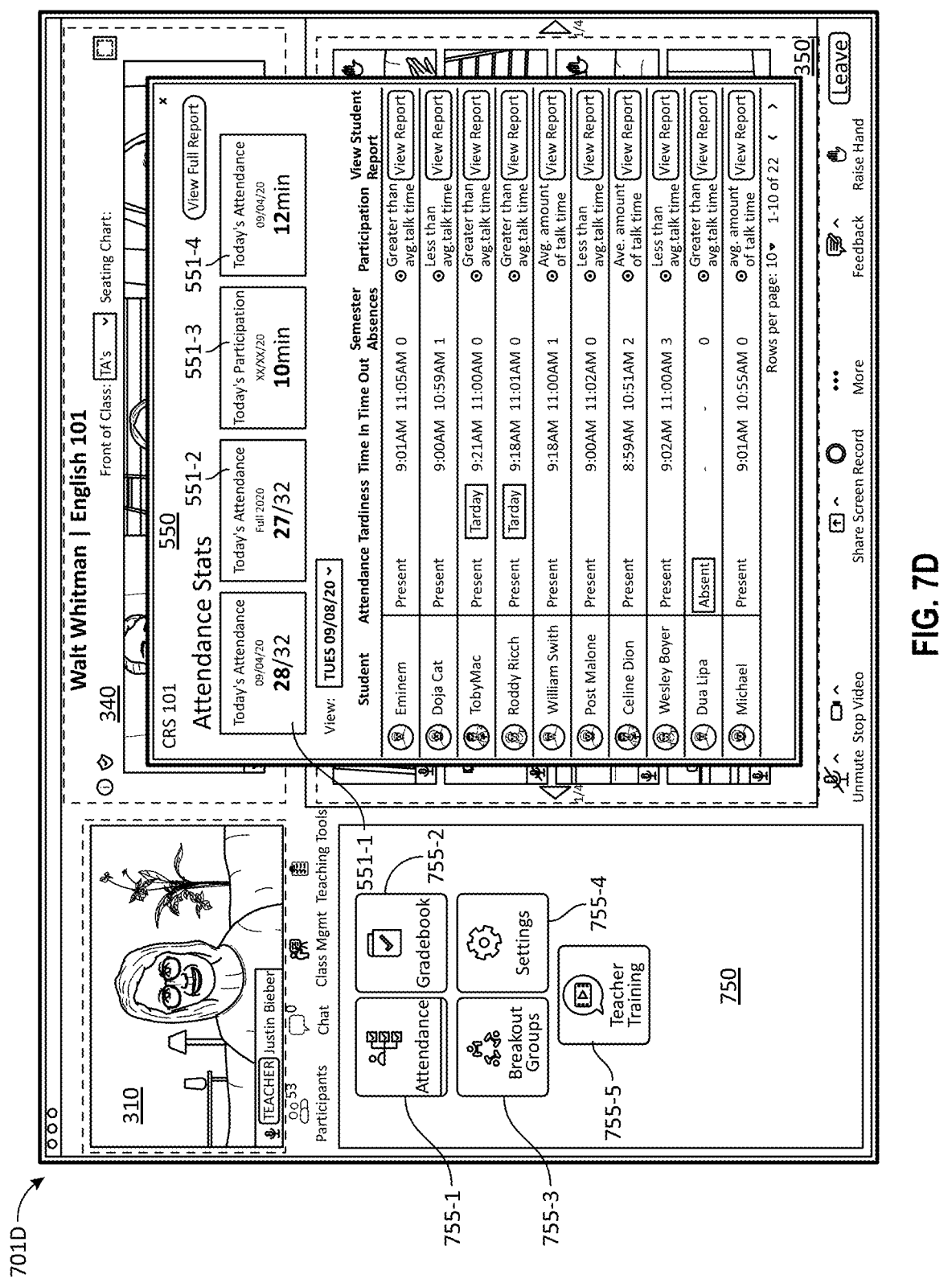

FIG. 7D illustrates virtual classroom 701D with an attendance statistics 550. Attendance tracking tool 755-1 (e.g., tracking tool 244) automatically registers whether students 325 have attended the class, when they log in and out, and their participation level.

Figure 7E:
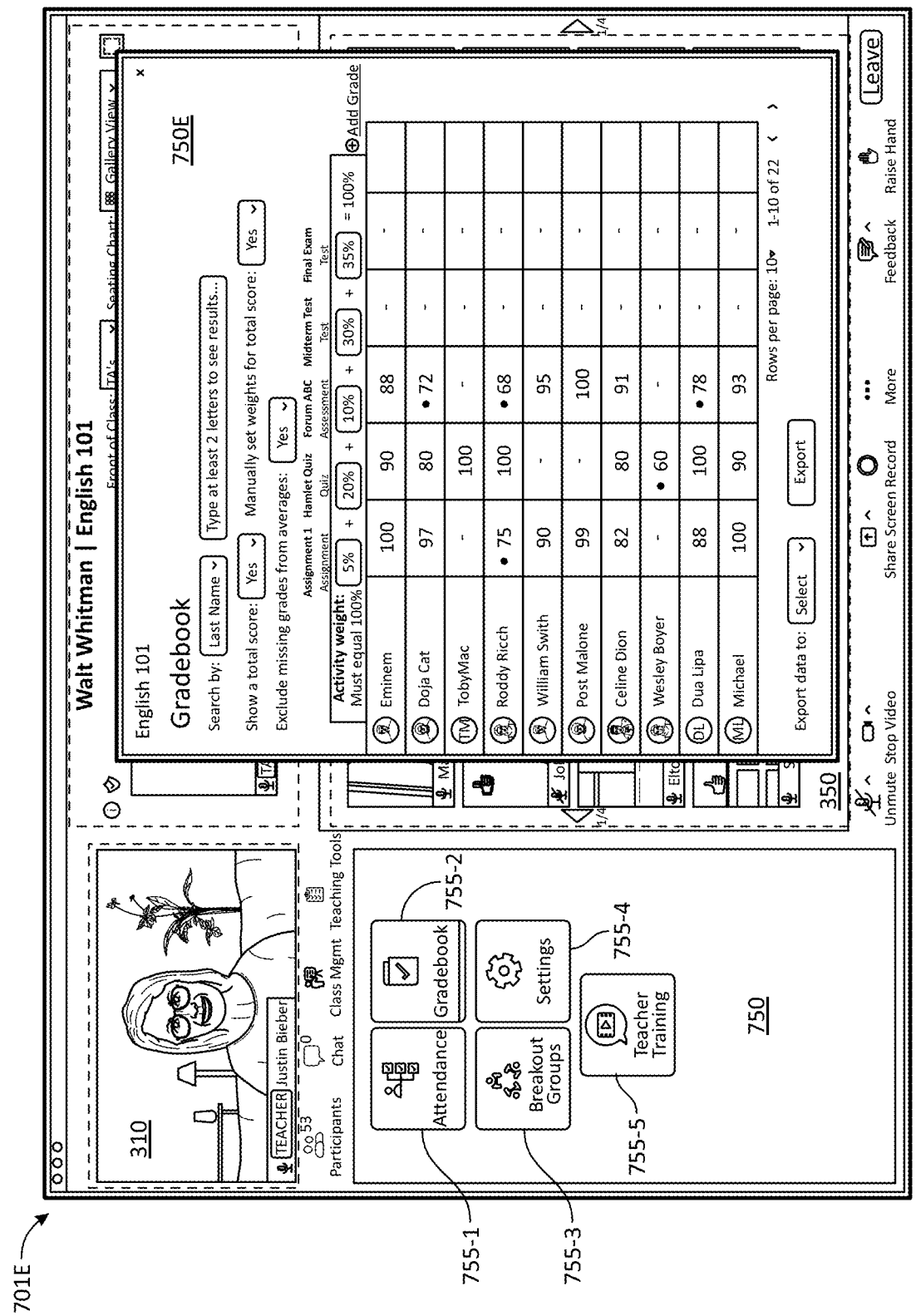

FIG. 7E includes virtual classroom 701E, with a gradebook 750E. In some embodiments, gradebook 750E allows teachers to manage grades both inside and outside the live classroom environment.

Figure 7F:
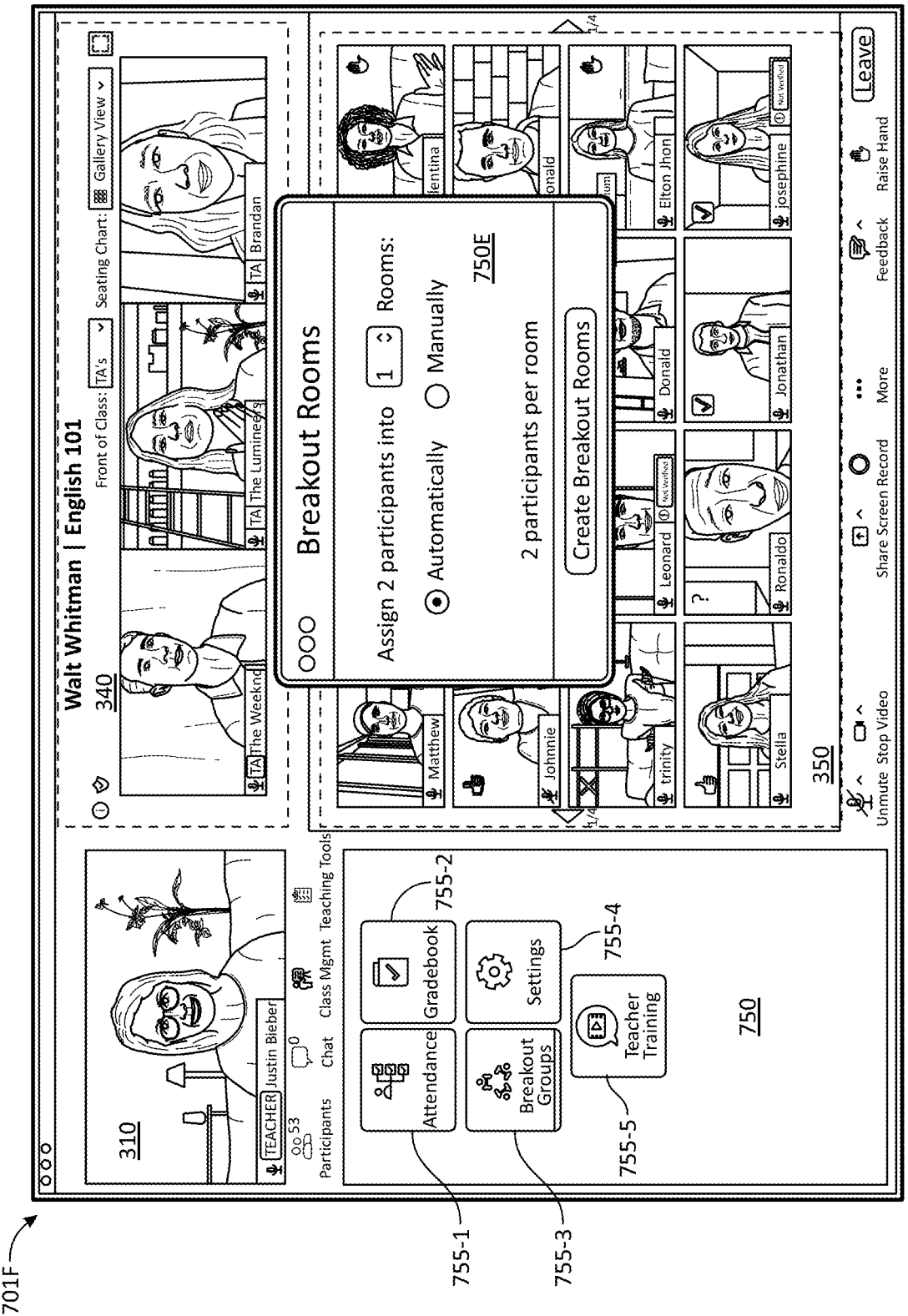

FIG. 7F illustrates virtual classroom 701F including a breakout room 750F. Breakout room 750F allows teacher 321 to break the class into smaller working groups, for a selected period of time or for special projects.

Figure 7G:
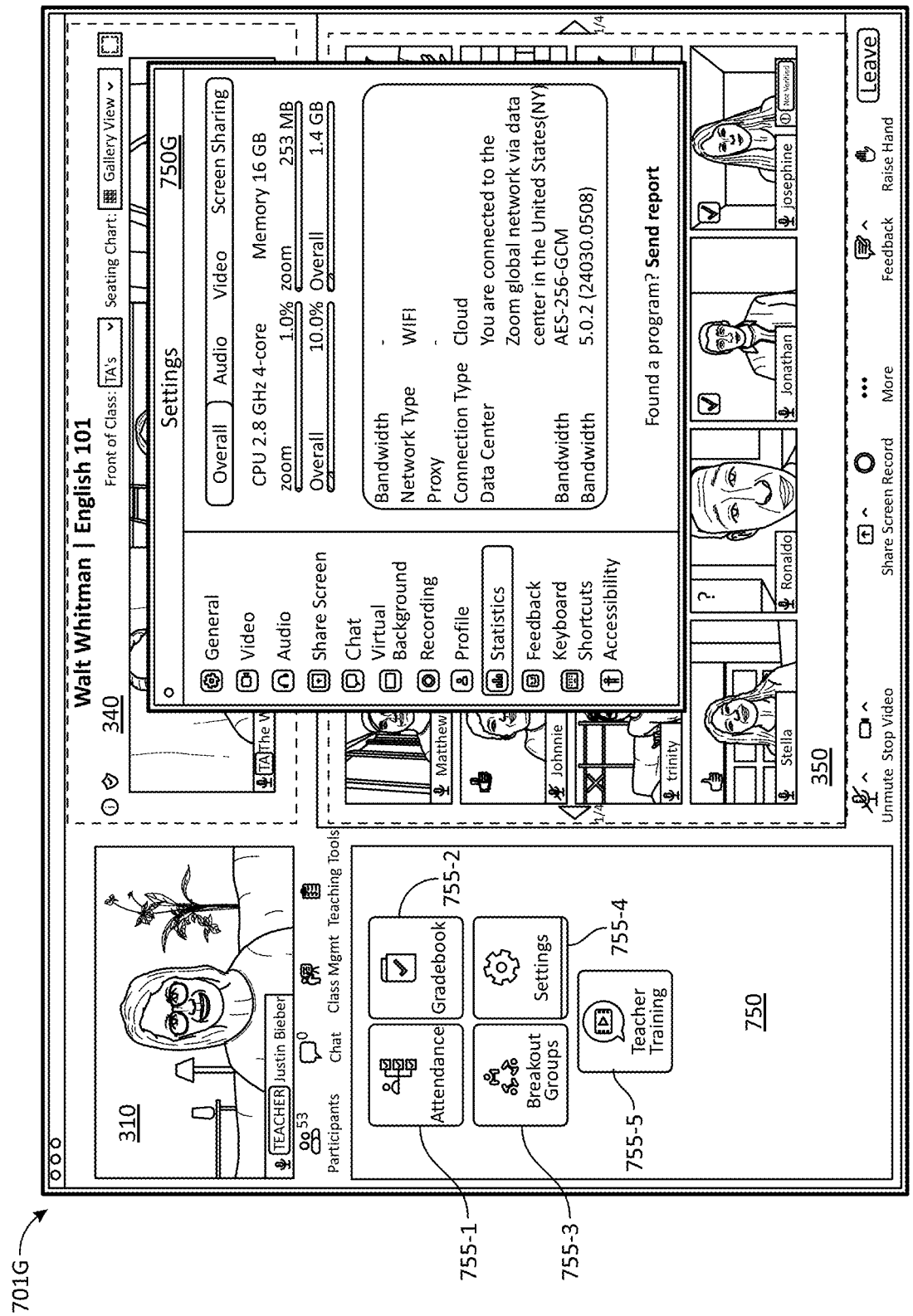

FIG. 7G illustrates virtual classroom 701G, including a settings display 750G. Teacher 321 can manage their class settings and the enhanced features of virtual classroom 701G from a settings button 755-4.

Figure 7H:
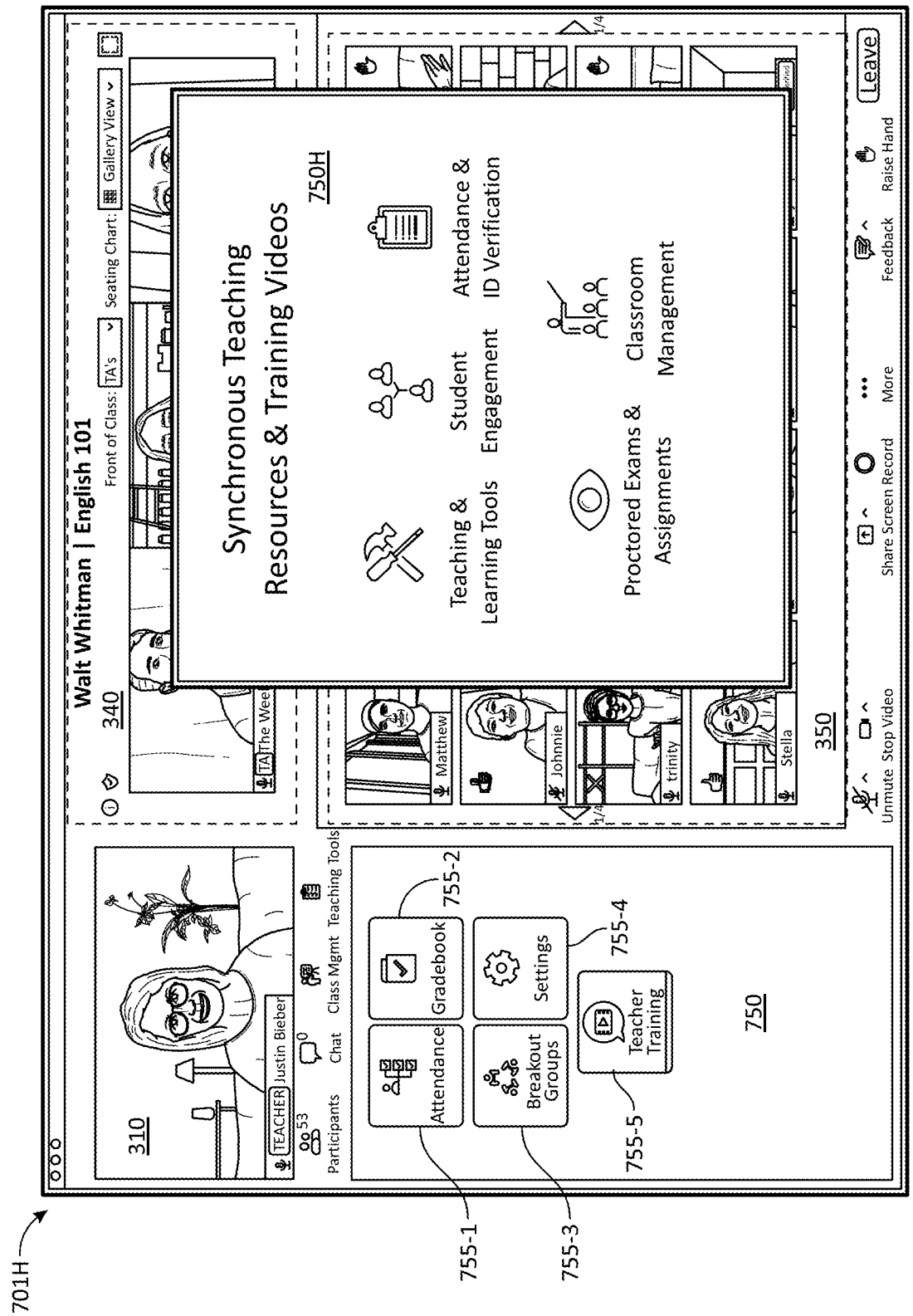

FIG. 7H illustrates virtual classroom 701H, including a menu 750H for multiple training videos. In some embodiments, menu 750H includes resources and training videos to educate teacher 321 how to best do synchronous learning and fully utilize a virtual classroom teaching and learning environment, as disclosed herein.

Figure 8:
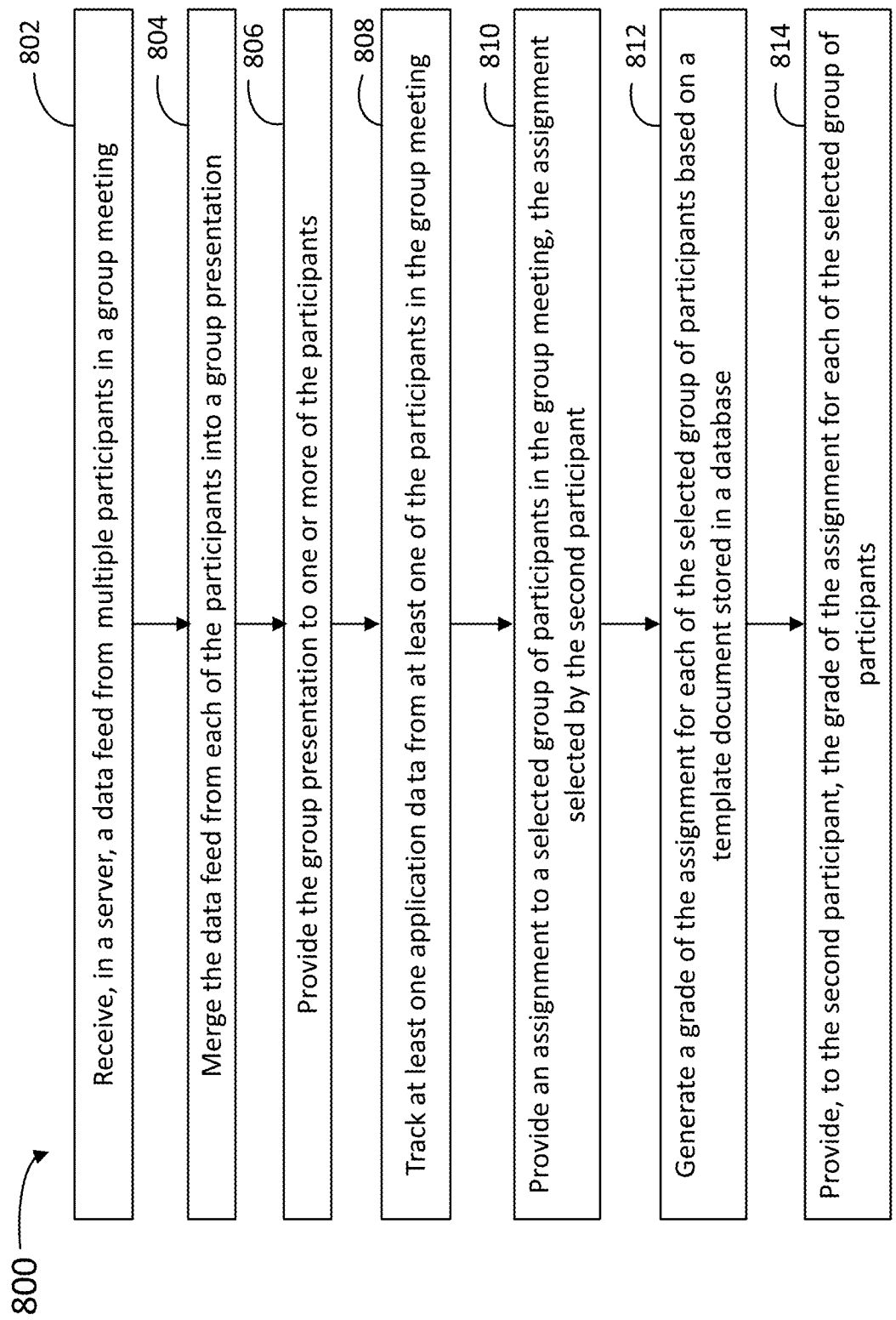
FIG. 8 is a flow chart illustrating steps in a method for providing a participant segment based on raw data input from multiple participants, according to some embodiments.

FIG. 8 is a flow chart illustrating steps in method 800 for providing a participant segment based on raw data input from multiple participants, according to some embodiments. Method 800 may be performed at least partially by any one of the plurality of servers illustrated in FIG. 1. For example, at least some of the steps in method 800 may be performed by one component in a system, including a mobile device running code for a browser and an application to access a virtual classroom hosted by a classroom engine. In some embodiments, the classroom engine may be coupled with an application layer, as disclosed herein. The application layer hosts and handles an application installed in a client device for participants who may access the virtual classroom remotely The classroom engine provides the virtual classroom with the support of a learning tool, a tracking tool, a grading tool, and a multimedia tool, as disclosed herein. Accordingly, at least some of the steps in method 800 may be performed by a processor executing commands stored in a memory of one of the servers, or accessible by at least one of the servers. Further, in some embodiments, at least some of the steps in method 800 may be performed overlapping in time, almost simultaneously, or in a different order from the order illustrated in method 800. Moreover, a method consistent with some embodiments disclosed herein may include at least one, but not all, of the steps in method 800.

Step 802 includes receiving, in a server, a data feed from multiple participants in a group meeting.

Step 804 includes merging the data feed from each of the participants into a group presentation. In some embodiments, step 804 includes synchronizing the data feed from each of the participants and forming the group presentation as a real-time experience.

In some embodiments, step 804 includes arranging multiple video feeds of the participants in a podium for a teacher, a front row for a teaching assistant, and a gallery view for a student, wherein the podium and the front row are static fields and the gallery view comprises a scrollable field. In some embodiments, step 804 includes blocking a video feed of a first participant from a display for a second participant. In some embodiments, step 804 includes opening a one-on-one meeting between a first participant and a second participant in the group meeting.

Step 806 includes providing the group presentation to one or more of the participants. In some embodiments, step 806 includes receiving a feedback from the at least one participant based on the group presentation, and displaying the feedback on a display of the group presentation visible to a second participant in the group meeting.

Step 808 includes tracking at least one application data from at least one participant in the group meeting. In some embodiments, step 808 includes tracking a level of activity around an application for the group meeting in a display for the at least one participant, for a selected period of time.

Step 810 includes providing an assignment to a selected group of participants in the group meeting, the assignment selected by the second participant. In some embodiments, step 810 includes providing an engagement report of the at least one participant to a second participant in the group meeting, wherein the engagement report comprises an attention level of the at least one participant based on the at least one application data. In some embodiments, step 810 includes providing a proctor view of the assignment on each of the participants in the selected group of participants for access by the second participant, wherein generating the grade of the assignment is based on the proctor view.

Step 812 includes generating a grade of the assignment for each of the selected group of participants based on a template document stored in a database.

Step 814 includes providing, to the second participant, the grade of the assignment for each of the selected group of participants. In some embodiments, step 814 includes providing a recording of the group meeting to the at least one participant, the recording of the group meeting comprising a closed caption text record of an audio feed, a video record of a video feed, and network link to access a teaching material presented during the group meeting.

Figure 9:
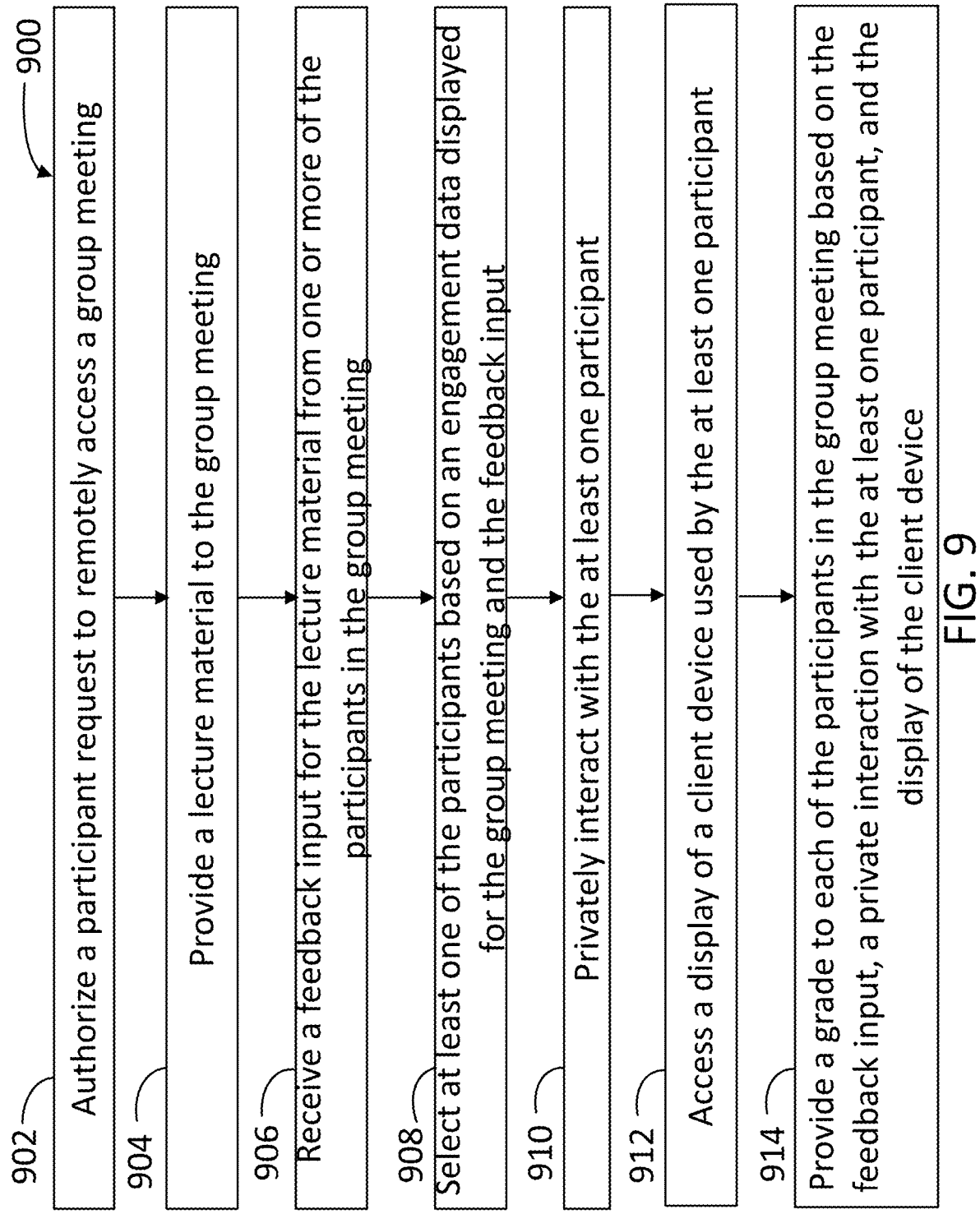
FIG. 9 is a flow chart illustrating steps in method for providing an advertising campaign for a product or item for sale, according to some embodiments.

FIG. 9 is a flow chart illustrating steps in method 900 for providing an advertising campaign for a product or item for sale, according to some embodiments. Method 900 may be performed at least partially by any one of the plurality of servers illustrated in FIG. 1. For example, at least some of the steps in method 900 may be performed by one component in a system, including a mobile device running code for a browser and an application to access a virtual classroom hosted by a classroom engine. In some embodiments, the classroom engine may be coupled with an application layer, as disclosed herein. The application layer hosts and handles an application installed in a client device for participants who may access the virtual classroom remotely The classroom engine provides the virtual classroom with the support of a learning tool, a tracking tool, a grading tool, and a multimedia tool, as disclosed herein. Accordingly, at least some of the steps in method 900 may be performed by a processor executing commands stored in a memory of one of the servers, or accessible by at least one of the servers. Further, in some embodiments, at least some of the steps in method 900 may be performed overlapping in time, almost simultaneously, or in a different order from the order illustrated in method 900. Moreover, a method consistent with some embodiments disclosed herein may include at least one, but not all, of the steps in method 900.

Step 902 includes authorizing a participant request to remotely access a group meeting.

Step 904 includes providing a lecture material to the group meeting.

Step 906 includes receiving a feedback input for the lecture material from one or more participants in the group meeting. In some embodiments, step 906 includes displaying a raised hand icon over a participant's image for the teacher to select the order in which participants will provide their feedback. In some embodiments, step 906 includes displaying the raised hand icon for the teacher or teacher assistant only. In some embodiments, step 906 includes displaying the raised hand of one or more participants for all participants. In some embodiments, step 906 includes re-ordering the images for the participants according to the order in which they have raised their hands to provide feedback.

Step 908 includes selecting at least one participant based on an engagement data displayed for the group meeting and the feedback input.

Step 910 includes privately interacting with the at least one participant. In some embodiments, step 910 includes setting a one-on-one chat between a teacher and a student in a virtual classroom.

Step 912 includes accessing a display of a client device used by the at least one participant. In some embodiments, step 912 includes verifying that the at least one participant is focused on a learning material presented in a virtual classroom. In some embodiments, step 912 includes proctoring an exam or other class assignment, and verifying that the at least one participant is a student properly fulfilling the assignment.

Step 914 includes providing a grade to each of the participants in the group meeting based on the feedback input, a private interaction with the at least one participant, and the display of the client device. In some embodiments, step 914 includes grading the at least one participant based on a private interaction. In some embodiments, step 914 includes accessing a display of a client device used by the at least one participant, and wherein providing the grade to each of the participants comprises grading the at least one participant based on the display of the client device.

Hardware Overview

Figure 10:
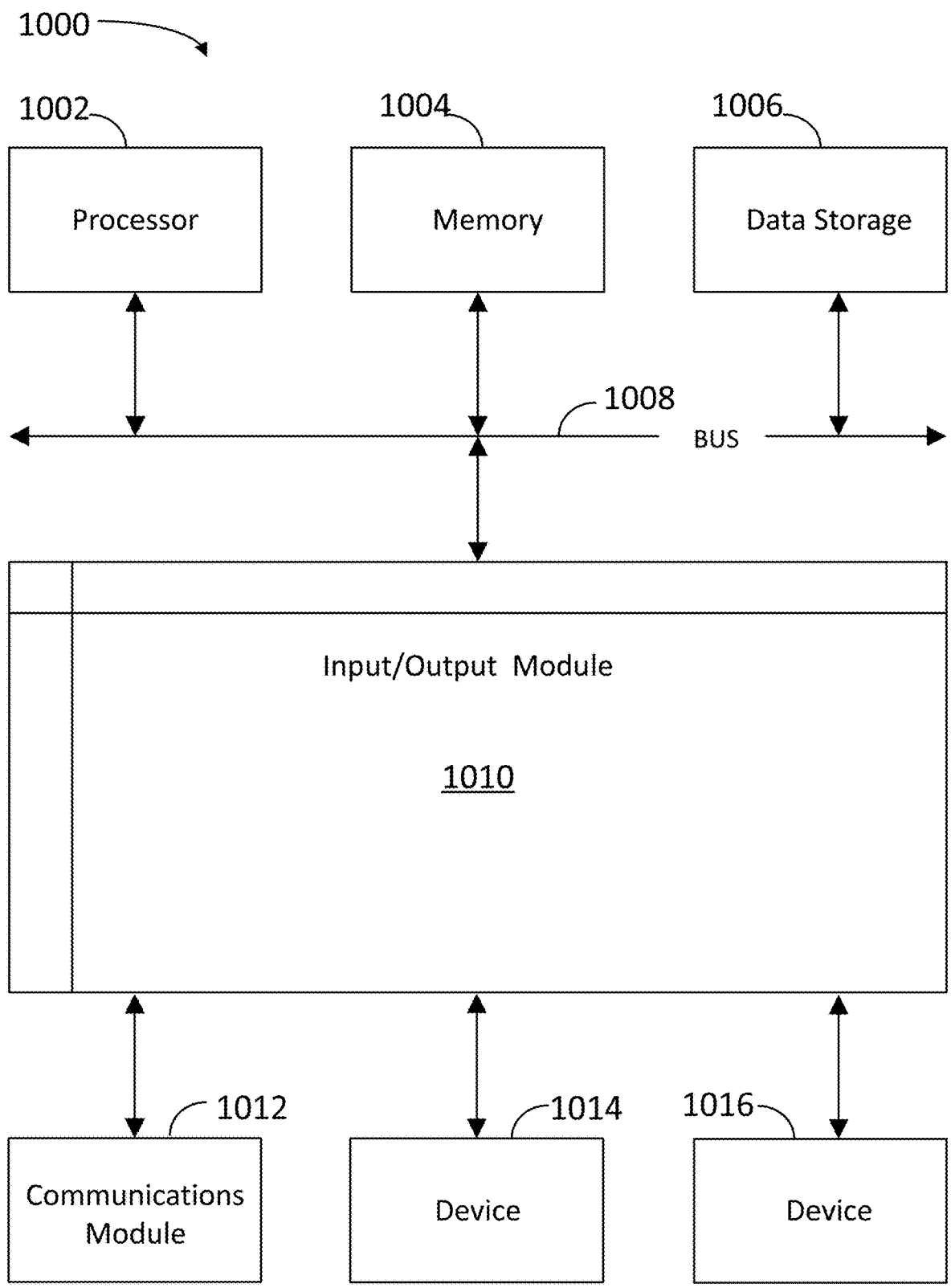
FIG. 10 is a block diagram illustrating an example computer system with which the client and server of FIGS. 1 and 2 and the methods of FIGS. 8 and 9 can be implemented, according to some embodiments.

FIG. 10 is a block diagram illustrating an example computer system with which client devices 110, servers 130, and methods 800 and 900 can be implemented. In certain aspects, the computer system 1000 may be implemented using hardware or a combination of software and hardware, either in a dedicated server, integrated into another entity, or distributed across multiple entities.

Computer system 1000 (e.g., client device 110 and server 130) includes a bus 1008 or other communication mechanism for communicating information, and a processor 1002 (e.g., processors 212) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, e.g., one or more modules of computer program instructions encoded on a computer-readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. Input/output module 1010 can be any input/output module. Exemplary input/output modules 1010 include data ports such as USB ports. The input/output module 1010 is configured to connect to a communications module 1012. Exemplary communications modules 1012 (e.g., communications modules 218) include networking interface cards, such as Ethernet cards and modems. In certain aspects, input/output module 1010 is configured to connect to a plurality of devices, such as an input device 1014 (e.g., input device 214) and/or an output device 1016 (e.g., output device 216). Exemplary input devices 1014 include a keyboard and a pointing device (e.g., a mouse or a trackball) by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback (e.g., visual feedback, auditory feedback, or tactile feedback); and input from the user can be received in any form, including acoustic, speech, tactile, or brain wave input. Exemplary output devices 1016 include display devices, such as an LCD (liquid crystal display) monitor, for displaying information to the user.

According to one aspect of the present disclosure, the client device 110 and server 130 can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component (e.g., a data server), or that includes a middleware component (e.g., an application server), or that includes a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, a tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example and without limitation, a desktop computer, laptop computer, or tablet computer. Computer system 1000 can also be embedded in another device, for example and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires forming bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method, comprising:
   receiving, in a server, a data feed from multiple client devices used by multiple participants in a group meeting,
   wherein the data feed comprises at least one of a video stream, an audio stream, and a user selection;
   merging the data feed from each of the participants into a group presentation;
   providing the group presentation to one or more of the participants;
   tracking at least one application data from at least one participant in the group meeting;
   providing, in the group presentation, an assignment to a selected group of participants in the group meeting, the assignment selected by a second participant;
   generating a grade of the assignment for each participant in the selected group of participants based on a template document stored in a database;
   providing, to the second participant, the grade of the assignment for each participant in the selected group of participants; and
   arranging multiple video feeds of the participants in a podium for a teacher, a front row for a teaching assistant, and a gallery view for a student, wherein:
     the application data is generated by an application running in a client device for the at least one participant and hosted by the server,
     the application data comprises a feature in the video stream, the audio stream, or the user selection in the client device, and
     the podium and the front row are static fields and the gallery view comprises a scrollable field.

2. The computer-implemented method of claim 1, wherein
   merging the data feed from each of the participants into a group presentation comprises synchronizing the data feed from each of the participants and forming the group presentation as a synchronous experience.

3. The computer-implemented method of claim 1, wherein tracking at least one application data from at least one participant in the group meeting comprises tracking a level of activity around the application in a display of the client device for a selected period of time.

4. The computer-implemented method of claim 1, further comprising providing an engagement report of the at least one participant to a third participant in the group meeting, wherein the engagement report comprises an attention level of the at least one participant based on the at least one application data.

5. The computer-implemented method of claim 1, further comprising receiving a feedback from the at least one participant based on the group presentation, and displaying the feedback on a display of the group presentation visible to a third participant in the group meeting.

6. The computer-implemented method of claim 1, further comprising blocking a video feed of a first participant in the group meeting who is a first student from a display to a third participant in the group meeting who is a second student.

7. The computer-implemented method of claim 1, further comprising opening, in a display of the application in the client device, a one-on-one meeting between a first participant in the group meeting who is a student and a participant in the group meeting who is a teacher or a teaching assistant.

8. The computer-implemented method of claim 1, further comprising providing a proctor view of the assignment to each of the participants in the selected group of participants for access by the second participant, wherein generating the grade of the assignment is based on the proctor view.

9. The computer-implemented method of claim 1, further comprising providing a recording of the group meeting to the at least one participant, the recording of the group meeting comprising a closed caption text record of the audio stream, a video record of the video stream, and a network link to access a teaching material presented during the group meeting.

10. A system, comprising:
one or more processors; and
a memory storing instructions which, when executed by the one or more processors, cause the system to:
receive, in a server, a data feed from multiple participants in a group meeting wherein the data feed comprises at least one of a video stream, an audio stream, and a user selection;
merge the data feed from each of the participants into a group presentation;
provide the group presentation to one or more of the participants;
track at least one application data from at least one participant in the group meeting;
provide an assignment to a selected group of participants in the group meeting, the assignment being selected by a second participant;
generate a grade of the assignment for each participant in the selected group of participants based on a template document stored in a database;
provide, to the second participant, the grade of the assignment for each participant in the selected group of participants, wherein, to merge the data feed from each of the participants into the group presentation, the one or more processors execute the instructions to synchronize the data feed from each of the participants and to form the group presentation as a synchronous experience; and
arrange multiple video feeds of the participants in a podium for a teacher, a front row for a teaching assistant, and a gallery view for a student, wherein:
the application data is generated by an application running in a client device for the at least one participant and hosted by the server,
the application data comprises a feature in the video stream, the audio stream, or the user selection in the client device, and
the podium and the front row are static fields and the gallery view comprises a scrollable field.

11. The system of claim 10, wherein the one or more processors further execute the instructions to provide an engagement report of the at least one participant to a third participant in the group meeting, and wherein the engagement report comprises an attention level of the at least one participant based on the application data.

12. The system of claim 10, wherein the one or more processors further execute instructions to: receive a feedback from the at least one participant based on the group presentation; and display the feedback on a display of the group presentation visible to a third participant in the group meeting.

13. The system of claim 10, wherein the one or more processors further execute instructions to provide a recording of the group meeting to the at least one participant, the recording of the group meeting comprising a closed caption text record of the audio stream, a video record of the video stream, and a network link to access a teaching material presented during the group meeting.

* * * * *